(12) United States Patent  
Tsutsumi

(10) Patent No.: US 8,577,132 B2  
(45) Date of Patent: Nov. 5, 2013

(54) ELECTRONIC DOCUMENT GENERATION SYSTEM, ELECTRONIC DOCUMENT GENERATION METHOD, AND PROGRAM

(75) Inventor: Takahiro Tsutsumi, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 85 days.

(21) Appl. No.: 13/308,051

(22) Filed: Nov. 30, 2011

(65) Prior Publication Data

US 2012/0141022 A1 Jun. 7, 2012

(30) Foreign Application Priority Data

Dec. 1, 2010 (JP) ................................. 2010-268459

(51) Int. Cl.
*G06K 9/00* (2006.01)

(52) U.S. Cl.
USPC ........................... 382/162; 382/164; 382/165

(58) Field of Classification Search
USPC .......... 382/162, 164, 165, 176, 209; 358/406, 358/448, 504; 380/51; 347/131; 713/186; 726/32
See application file for complete search history.

(56) References Cited

U.S. PATENT DOCUMENTS

| | | | | |
|---|---|---|---|---|
| 5,592,298 | A | * | 1/1997 | Caruso ......................... 358/504 |
| 5,974,548 | A | * | 10/1999 | Adams .......................... 713/186 |
| 6,351,815 | B1 | * | 2/2002 | Adams ............................ 726/32 |
| 8,000,529 | B2 | * | 8/2011 | Chao et al. .................... 382/176 |

FOREIGN PATENT DOCUMENTS

| | | |
|---|---|---|
| JP | 2003-310953 | 11/2003 |
| JP | 2006-157371 | 6/2006 |
| JP | 2009-141597 | 6/2009 |
| JP | 2010-98743 | 4/2010 |

OTHER PUBLICATIONS

Notification of Reasons for Refusal mailed Oct. 9, 2012, directed to Japanese Application No. 2010-268459; 6 pages.

* cited by examiner

*Primary Examiner* — Anh Do
(74) *Attorney, Agent, or Firm* — Morrison & Foerster LLP

(57) ABSTRACT

An electronic document generation system includes a first layer generation unit that generates a character image layer that represents a character image in the scanned image by a predetermined number of bits, an edge image generation unit that generates an edge image of the character image, a second layer generation unit that generates an antialiasing layer that includes a binarized image generated based on the edge image and that is to be superimposed in a semi-transparent state on the character image layer, a file generation unit that generates the electronic document that includes the character image layer and the antialiasing layer, and a base color determination unit that determines a base color of the character image. The second layer generation unit sets the same color as the base color for the antialiasing layer.

14 Claims, 25 Drawing Sheets

| 0 | 0 | 0 | 0 | 0 | 0 | 0 | 0 | 1 |
|---|---|---|---|---|---|---|---|---|
| 0 | 0 | 0 | 0 | 0 | 0 | 0 | 1 | 0 |
| 0 | 0 | 0 | 0 | 0 | 0 | 1 | 0 | 0 |
| 0 | 0 | 0 | 0 | 0 | 1 | 0 | 0 | 0 |
| 0 | 0 | 0 | 0 | 1 | 0 | 0 | 0 | 0 |
| 0 | 0 | 0 | 1 | 0 | 0 | 0 | 0 | 0 |
| 0 | 0 | 1 | 0 | 0 | 0 | 0 | 0 | 0 |
| 0 | 1 | 0 | 0 | 0 | 0 | 0 | 0 | 0 |
| 1 | 0 | 0 | 0 | 0 | 0 | 0 | 0 | 0 |

ELECTRONIC DOCUMENT GENERATION SYSTEM, ELECTRONIC DOCUMENT GENERATION METHOD, AND PROGRAM

This application is based on Japanese Patent Application No. 2010-268459 filed on Dec. 1, 2010, the contents of which are hereby incorporated by reference.

BACKGROUND OF THE INVENTION

1. Technical Field

The present invention relates to an electronic document generation system for generating an electronic document, and technology related thereto.

2. Related Art

In technology for generating electronic documents, there are techniques for enhancing the visibility of characters while increasing the compression rate. For example, there is a technique for generating an electronic document in a high-compression portable document format (PDF) based on a scanned image (see JP 2009-141597A, for example).

With high-compression PDF documents, rather than the same compression method being applied to the entirety of image data, for example, a scanned image is divided into a character area and a non-character area, and different compression methods are applied to each type of the regions. To be more specific, image data in the character area is binarized while maintaining high resolution, whereas image data in the non-character area is converted into low-resolution image data without being binarized in order to maintain tone, and is then compressed at a high compression rate (high compression). This generates an electronic document file (high-compression PDF file) with a reduced data amount (file size) while maintaining the readability of characters.

However, with such binarized characters in the character area in a high-compression PDF, there is the problem that jaggies on the outlines of the characters are noticeable in the case of using a slightly lower resolution. A similar problem also occurs in the case where these characters are enlarged and viewed on a monitor.

SUMMARY OF THE INVENTION

It is an object of the present invention to provide electronic document creation technology that enables a reduction in jaggies on characters while suppressing an increase in file size.

According to a first aspect of the present invention, an electronic document generation system for generating an electronic document based on a scanned image includes a first layer generation unit configured to generate a character image layer that represents a character image in the scanned image by a predetermined number of bits, an edge image generation unit configured to generate an edge image of the character image, a second layer generation unit configured to generate an antialiasing layer that includes a binarized image generated based on the edge image and that is to be superimposed in a semi-transparent state on the character image layer, a file generation unit configured to generate the electronic document that includes the character image layer and the antialiasing layer, and a base color determination unit configured to determine a base color of the character image. The second layer generation unit sets the same color as the base color for the antialiasing layer.

According to a second aspect of the present invention, an electronic document generation system for generating an electronic document based on a scanned image includes a first layer generation unit configured to generate a character image layer that represents a character image in the scanned image by a predetermined number of bits, an edge image generation unit configured to generate an edge image of the character image, a second layer generation unit configured to generate an antialiasing layer that includes a binarized image generated based on the edge image and that is to be superimposed in a semi-transparent state on the character image layer, a file generation unit configured to generate the electronic document that includes the character image layer and the antialiasing layer, and a character color determination unit configured to determine a character color of the character image. The second layer generation unit sets the same color as the character color for the antialiasing layer, and generates the antialiasing layer as a layer that is commonly applied to a plurality of character image regions that have the same character color and each have a different base color.

According to a third aspect of the present invention, an electronic document generation system for generating an electronic document based on a scanned image includes a first layer generation unit configured to generate a character image layer that represents a character image in the scanned image by a predetermined number of bits, an edge image generation unit configured to generate an edge image of the character image, a second layer generation unit configured to generate an antialiasing layer that includes a binarized image generated based on the edge image and that is to be superimposed in a semi-transparent state on the character image layer, and a file generation unit configured to generate the electronic document that includes the character image layer and the antialiasing layer. The second layer generation unit determines a largest base region that is a base region having the largest area from among a plurality of base regions each having a different base color, and determines a largest character image region that is a character image region having the largest area from among a plurality of character image regions each having a different character color, and the second layer generation unit generates the antialiasing layer for one of the largest base region and the largest character image region that has a larger area.

According to a fourth aspect of the present invention, a non-transitory computer-readable recording medium on which a computer program is recorded, the computer program executing the steps of a) generating a character image layer that represents a character image in a scanned image by a predetermined number of bits, b) determining a base color of the character image, c) generating an edge image of the character image, d) generating an antialiasing layer that includes a binarized image generated based on the edge image and that is to be superimposed in a semi-transparent state on the character image layer, and e) generating an electronic document that includes the character image layer and the antialiasing layer. The step d) includes the step of d-1) setting the same color as the base color for the antialiasing layer.

According to a fifth aspect of the present invention, an electronic document generation method for generating an electronic document based on a scanned image includes the steps of a) generating a character image layer that represents a character image in the scanned image by a predetermined number of bits, b) determining a base color of the character image, c) generating an edge image of the character image, d) generating an antialiasing layer that includes a binarized image generated based on the edge image and that is to be superimposed in a semi-transparent state on the character image layer, and e) generating an electronic document that includes the character image layer and the antialiasing layer.

The step d) includes the step of d-1) setting the same color as the base color for the antialiasing layer.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram showing an edge image and the like.

FIG. 12 is a diagram showing an obliqueness detection filter.

FIG. 20 is a diagram showing an edge image and the like.

FIG. 26 is a diagram showing an example of a configuration of a system using a personal computer or the like.

DETAILED DESCRIPTION OF THE PREFERRED EMBODIMENTS

Hereinafter, embodiments of the present invention will be described with reference to the drawings.

1. First Embodiment 1-1. Configuration

Figure 1:
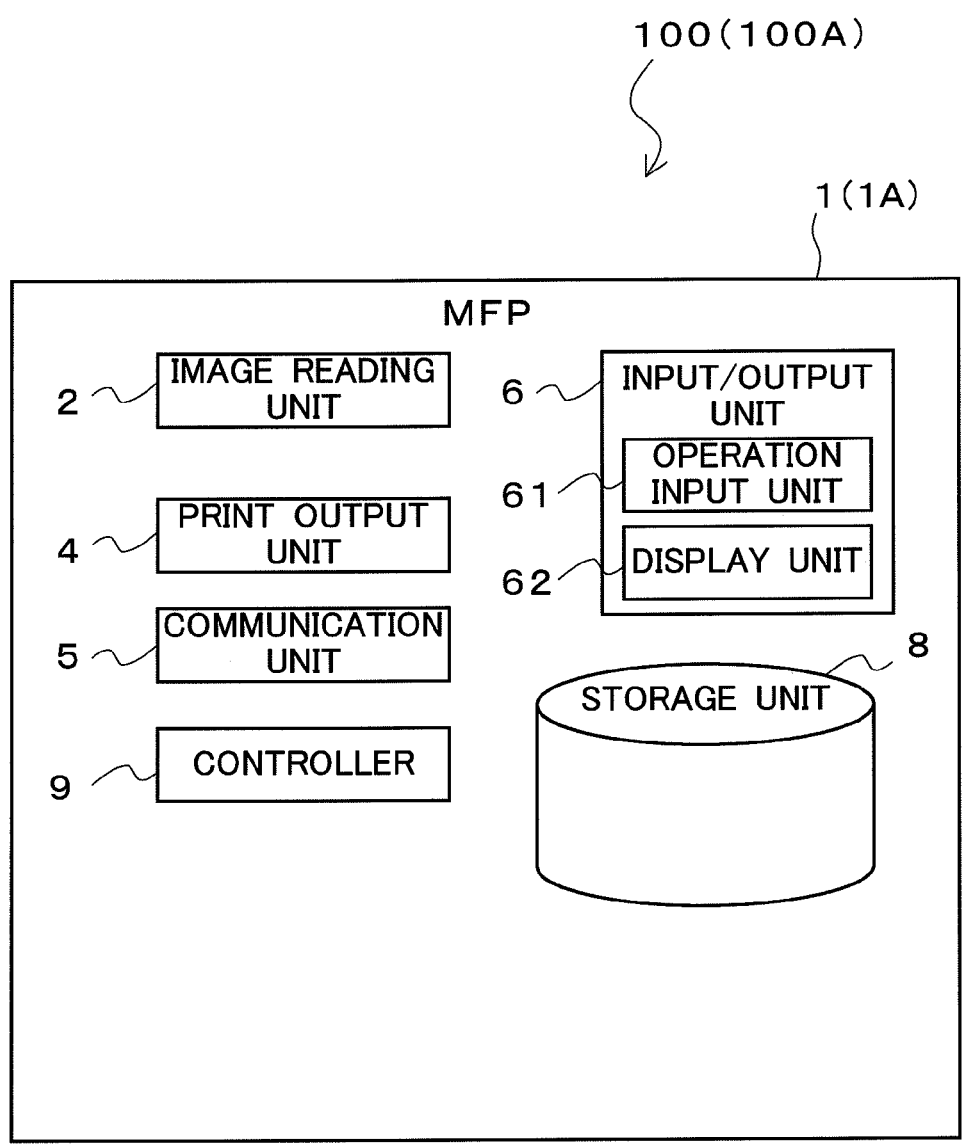
FIG. 1 is a schematic diagram showing an electronic document generation system according to a first embodiment.

FIG. 1 is a schematic diagram showing an electronic document generation system 100 (100A) according to a first embodiment. Here, the electronic document generation system 100 is configured including a multifunction peripheral (also abbreviated as an "MFP") 1 (1A).

This electronic document generation system 100 is a system for converting an image (also referred to as a "document image" or a "scanned image") obtained by optically reading a document (such as a paper document) into an electronic data format. To be more specific, a document is converted into electronic data by the MFP 1 generating a document image and executing image processing or the like on that document image.

The MFP 1 is a device (also referred to as a "multifunction peripheral") having a scanner function, a printer function, a copy function, a facsimile function, and the like. Specifically, the MFP 1 includes an image reading unit 2, a print output unit 4, a communication unit 5, an input/output unit 6, a storage unit 8, and a controller 9 and implements the aforementioned functions by causing the units to operate in a cooperative manner.

The image reading unit 2 is a processing unit that optically reads a document placed in a predetermined position on the MFP 1 and generates an image of that document (also referred to as a "document image"). The image reading unit 2 is also referred to as a scanner unit.

The print output unit 4 is an output unit that prints out an image on various types of media such as paper, based on image data regarding a target image.

The communication unit 5 is a processing unit that is capable of facsimile communications via a public network or the like. The communication unit 5 is also capable of network communications via a communication network NW. Using the network communications enables the MFP 1 to exchange various types of data with a desired destination party. The MFP 1 is also capable of transmission and reception of emails, using the network communications.

The input/output unit 6 includes an operation input unit 61 that receives input to the MFP 1, and a display unit 62 that displays and outputs various types of information.

The storage unit 8 is configured by a storage device such as a hard disk drive (HDD). The storage unit 8 stores document images or the like generated by, for example, the image reading unit 2.

The controller 9 is a control device that is incorporated in the MFP 1 and performs overall control of the MFP 1. The controller 9 is configured as a computer system including, for example, a CPU and various types of semiconductor memories (such as a RAM and a ROM). Various types of the functions of the MFP 1 are implemented by the CPU executing predetermined software programs (hereinafter also referred to simply as "programs") stored in a ROM (e.g., EEPROM) under the control of the controller 9 so that the various types of processing units are implemented and operate. Note that the programs may be recorded on various types of portable (or non-transitory) computer-readable recording media (such as a USB memory), read out from the recording media, and installed in the MFP 1. Alternatively, the programs may be downloaded via a network or the like and installed in the MFP 1.

Figure 2:
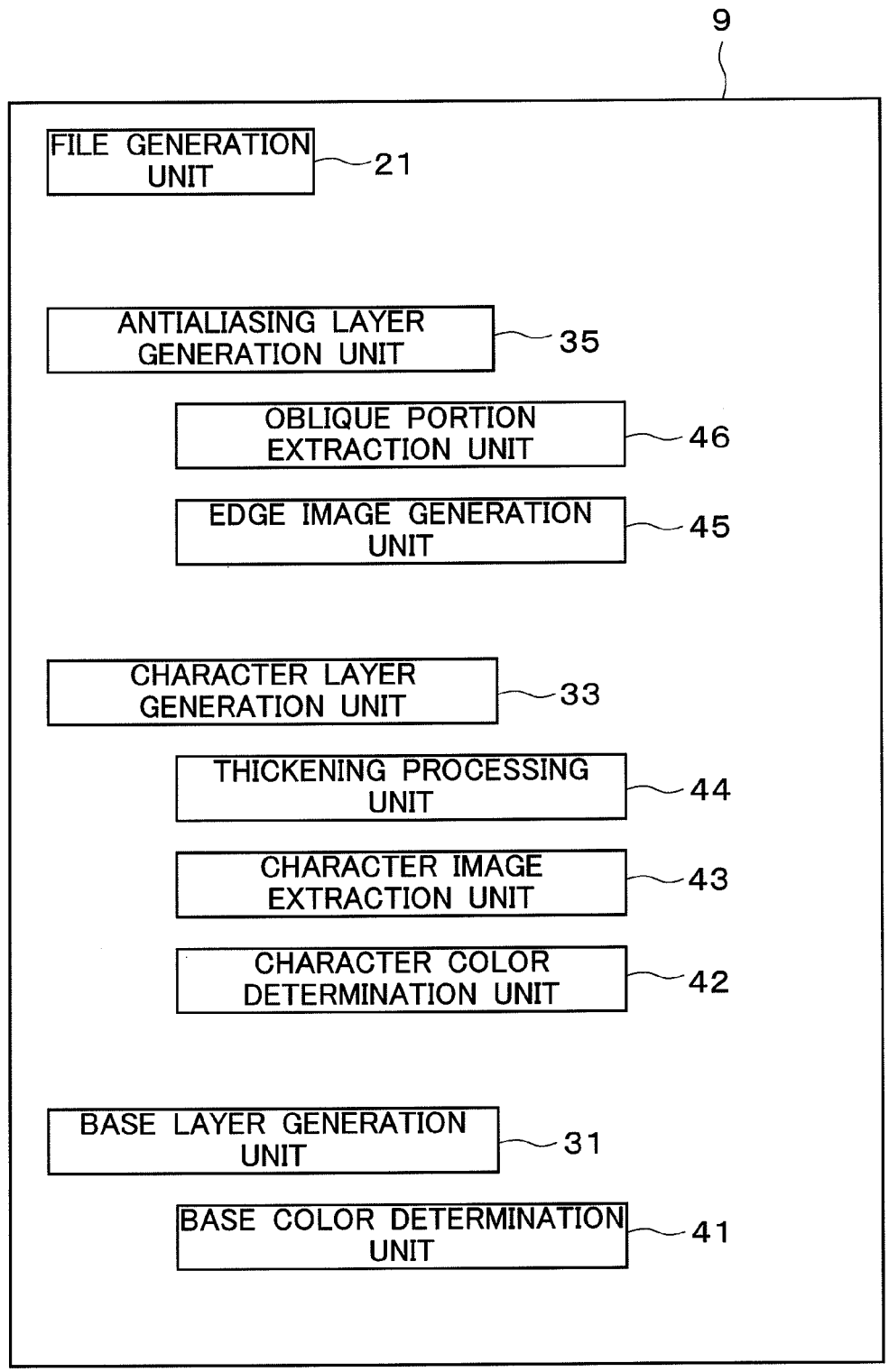
FIG. 2 is a functional block diagram of a controller.

FIG. 2 is a functional block diagram of the controller 9. As shown in FIG. 2, the controller 9 includes a file generation unit 21, a base layer generation unit 31, a character layer generation unit 33, and an antialiasing layer generation unit 35.

The file generation unit 21 has a function of performing various types of image processing on a scanned image generated by the image reading unit 2 and generating a file FL in a predetermined format (e.g., a portable document format (PDF)). The file generation unit 21 generates a file (electronic document) FL based on a scanned image in cooperation with, for example, the base layer generation unit 31, the character layer generation unit 33, and the antialiasing layer generation unit 35.

The base layer generation unit 31 is a processing unit that performs processing for generating a base layer LU, the character layer generation unit 33 is a processing unit that performs processing for generating a character image layer LC, and the antialiasing layer generation unit 35 is a processing unit that performs processing for generating an antialiasing layer LA. The layers LU, LC, and LA (see FIG. 4 or the like) will be discussed later.

The controller 9 further includes, for example, a base color determination unit 41, a character color determination unit 42, a character image extraction unit 43, a thickening processing unit 44, an edge image generation unit 45, and an oblique portion extraction unit 46. The details of processing performed by these processing units will be discussed later.

1-2. Overview of Image Processing

As mentioned above, the MFP 1 has a function of performing predetermined image processing on a scanned image and generating a file FL in a predetermined format (such as a PDF file). The following describes such file generation processing. Note that this file generation function is implemented by the controller 9 or the like.

Figure 3:
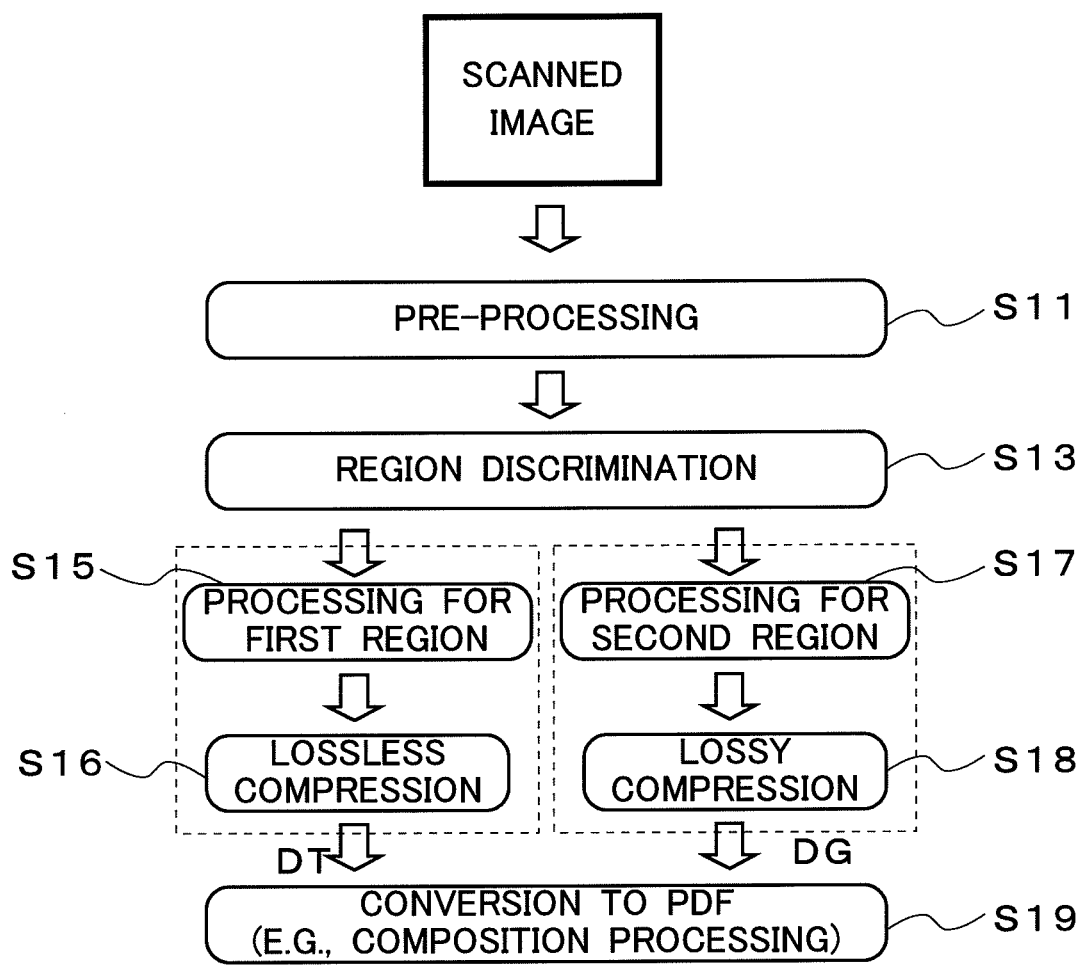
FIG. 3 is a flowchart showing an overview of processing for generating a file.

FIG. 3 is a flowchart showing an overview of the file generation processing.

As shown in FIG. 3, predetermined pre-processing is first performed on a scanned image acquired by the image reading unit 2 (step S11). This pre-processing can include, for example, processing for converting an image format and processing for adjusting the resolution.

Next, region discrimination processing for discriminating between a character area, which is an area regarding characters, and the other area (also referred to as a "non-character area") is executed (step S13). Thereafter, processing according to the properties of each type of the regions is performed, which enables a reduction in the file capacity while maintaining the readability of characters. Note that examples of the non-character area include regions including photographs or graphics.

For an image in the character area, processing for the character area (step S15) and lossless compression processing (step S16) are performed. For the character area, in order to maintain the readability of characters, binarization processing or the like is performed while maintaining a high resolution, and data DT is generated. This data DT undergoes lossless compression in a predetermined format and is then stored. Performing lossless compression avoids a decrease in the readability of characters.

For an image in the area (non-character area) other than the character area, on the other hand, in order to reduce the file capacity while maintaining tone, processing for reducing the resolution is performed without performing binarization processing, and data DG is generated (steps S17 and S18). This data DG undergoes lossy compression in a predetermined format (such as a JPEG format) and is then stored. Performing lossy compression considerably reduces the file size of a file FL to be generated.

Then, both of the data DT and the data DG are, for example, composited so as to generate a file FL in a predetermined format (step S19).

1-3. Processing for Character Area

Figure 4:
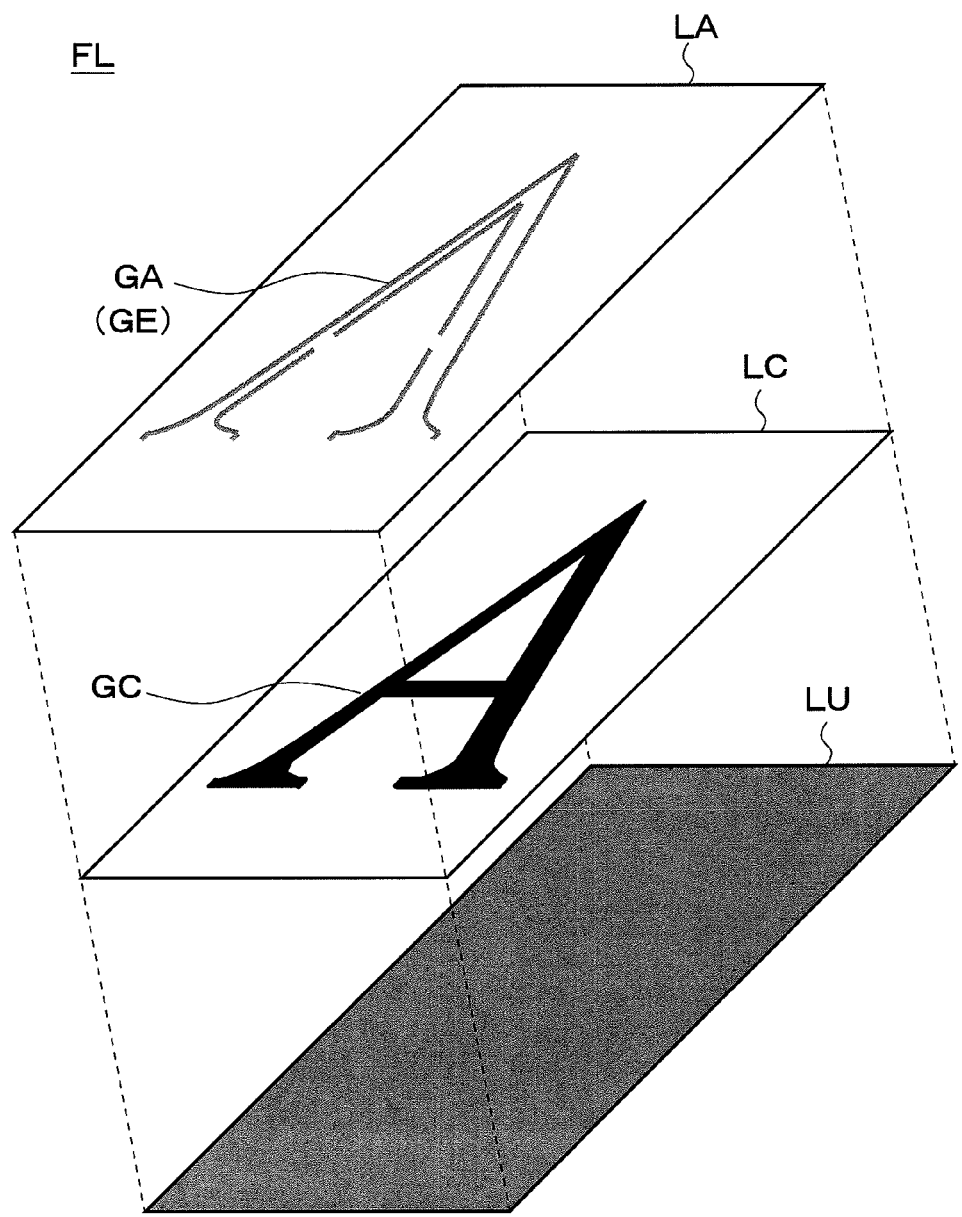
FIG. 4 is a diagram showing three layers constituting a character area.

FIG. 4 is a diagram showing three layers LU, LC, and LA that constitute the character area. As shown in FIG. 4, the character area in the file FL is composed of these three layers (specifically, the base layer LU, the character image layer LC, and the antialiasing layer LA). The base layer LU is a layer that defines the color of the base or the like, and the character image layer LC is a layer that includes a character image. The antialiasing layer LA is, as described later, a layer that is generated based on edge images or the like of characters.

Figure 5:
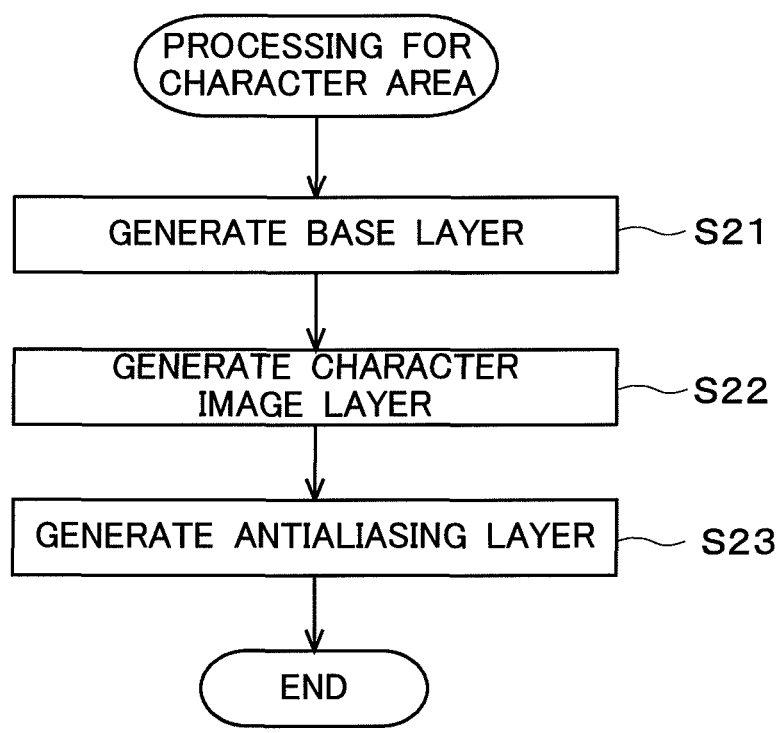
FIG. 5 is a flowchart showing processing for a character area.
Figure 6:
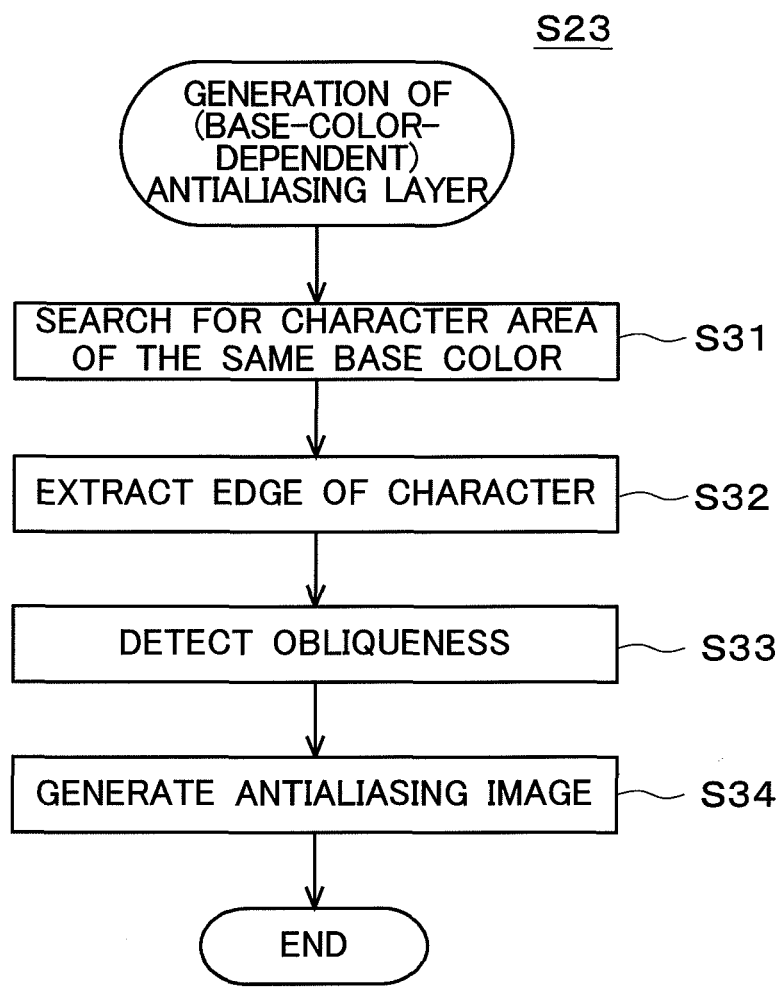
FIG. 6 is a flowchart showing processing for generating an antialiasing layer.

FIGS. 5 and 6 are flowcharts showing processing regarding the character area. The following describes the processing regarding the character area (specifically, for example, processing for generating a base layer LU, processing for generating a character image layer LC, and processing for generating an antialiasing layer LA) with reference to FIGS. 5 and 6.

First, in step S21 (FIG. 5), processing for generating a base layer LU for each page is executed by the base layer generation unit 31 and the like. Specifically, regions of the same color in the character area are extracted as a single base region, and a base layer LU is generated for each extracted base region. In other words, the character area is sectioned according to the base color, and one or more base layers LU are generated.

More specifically, in the case where the entire character area on a certain page has the same base color (e.g., white), the entire character area is regarded as a single base region, and a single base layer LU of a specific color (e.g., white) is generated. If the entire character area is sectioned into parts having four different base colors, each of the parts is regarded as one base region, and four base layers are generated. Each base layer LU has information regarding the location and size of the base region, information regarding the base color of the base region, and the like as header information.

Note that the base color of the character area (the base color of each character image) is determined by the base color determination unit 41. It is sufficient that the "color" of the base is determined by, for example, the element values of R, G, and B. In other words, it is sufficient that the "color" of the base is determined by the combination of the element values, namely, "hue", "chroma", and "brightness". A difference between two "colors" may be determined by whether or not corresponding element values all completely match, but the present invention is not limited thereto, and for example, a difference between two colors may be determined by whether or not mutual differences of corresponding element values fall within predetermined tolerances. For example, if mutual differences of corresponding element values are within several percent, the two colors may be determined as the same color.

Next, in step S22, processing for generating a character image layer (also simply referred to as a "character layer") LC for each page is executed by the character layer generation unit 33 and the like.

Specifically, in each base region, a region including character images GC (line drawings representing characters, and more specifically, clusters of pixels indicating the lines of characters) of the same color is extracted as a single same-color character image region by the character image extraction unit 43. Then, a character image layer LC is generated for each extracted same-color character image region.

To be more specific, in the case where all characters are of the same character color (e.g., black), the entire character area is regarded as a single same-color character image region, and a single character image layer LC is generated. On the other hand, in the case where the entire character area is sectioned into multiple (e.g., four) parts, each having a different character color, each of the parts is regarded as one same-color character image region, and multiple (e.g., four) character image layers LC are generated.

Note that the character color of each character image is determined by the character color determination unit 42. It is sufficient that the "color" of a character is determined in the same manner as the "color" of the base.

The character layer generation unit 33 generates a character image layer LC based on character images GC in the character area of a scanned image. The character image layer LC is a layer that represents a character image (specifically, each pixel in the character image) by a predetermined number of bits (here, one bit (in binary)). Note that a character image GC in which each pixel is represented by one bit ("0" or "1") is also referred to as a binarized image.

The character image layer LC has information (binarized image data) regarding the character images included therein as body information. The character image layer LC also has, for example, information regarding the location and size of the same-color character image region (for example, the upper left coordinates and lower right coordinates of the character image layer LC) and information regarding the character color as header information. For example, the character image layer LC has information (e.g., binarized image data) regarding a character image GC as shown in FIG. 4 as the body information, and character color information (e.g., black) of the character image layer LC as the header information. In this way, the character image layer LC is configured including the "color", the "binarized image", and the like. By generating the character image layer LC as a binarized image, the data amount can be suppressed.

Note that, in FIG. 4, a single character "A" is conceptually illustrated in the character image layer LC in order to show the presence of characters, but in actuality, the character image layer LC normally includes character images of multiple characters. The same applies to the antialiasing layer LA.

Then, in step S23, processing for generating an antialiasing layer LA for each page is executed by the antialiasing layer generation unit 35 and the like.

In the first embodiment, the antialiasing layer generation unit 35 generates a single antialiasing layer LA for a single base layer LU constituted from the base of the same color. To be more specific, in the case where multiple base layers LU (base regions), each having a different color, are present in the same page, the antialiasing layer LA is generated for only character images included in the base layer LU with the largest area (also referred to as the "largest base layer" or the "largest base region") from among the multiple base layers LU. For example, the antialiasing layer LA is generated for only a white base layer LU that constitutes 90% of the area of a certain page, and no antialiasing layer LA is generated for the base layers LU of the other colors that constitute the remaining 10% of the area of the page. This enables limiting the number of antialiasing layers LA to be generated and the range of the generation of antialiasing layers LA. Accordingly, the data amount can further be suppressed.

Specifically, as shown in FIG. 6, the antialiasing layer generation unit 35 first searches for a base region of the same color using the base color determination unit 41, and determines a region for which the antialiasing layer LA is to be generated (a target region for generation) in step S31. To be more specific, the antialiasing layer generation unit 35 determines, as the region for which the antialiasing layer LA is to be generated, only the base layer LU with the largest area ("the largest base layer") from among one or more base regions (here, base layers LU), each having a different color. The antialiasing layer generation unit 35 also detects the base color of the selected base layer LU (in other words, the base color of character images in that base layer LU). As described later, that base color is set as color information of the antialiasing layer LA.

Figure 7:
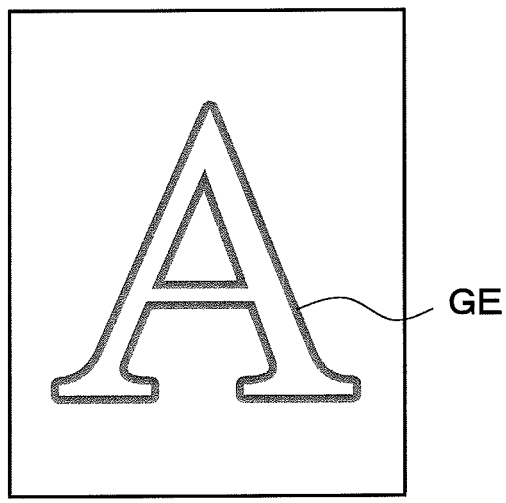
FIG. 7 is a conceptual diagram showing an edge image.
Figure 9:
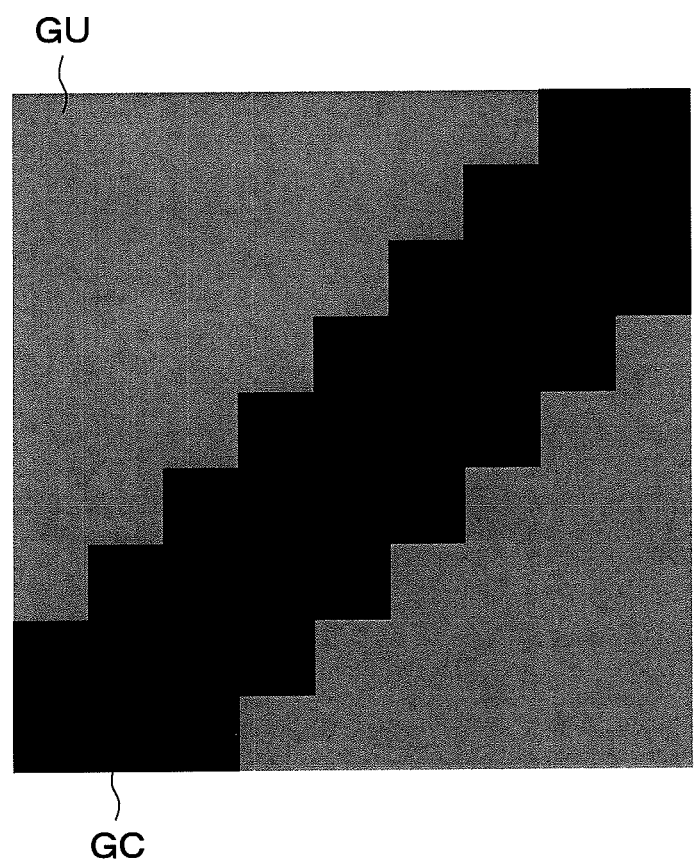
FIG. 9 is a diagram showing part of a character image.
Figure 10:
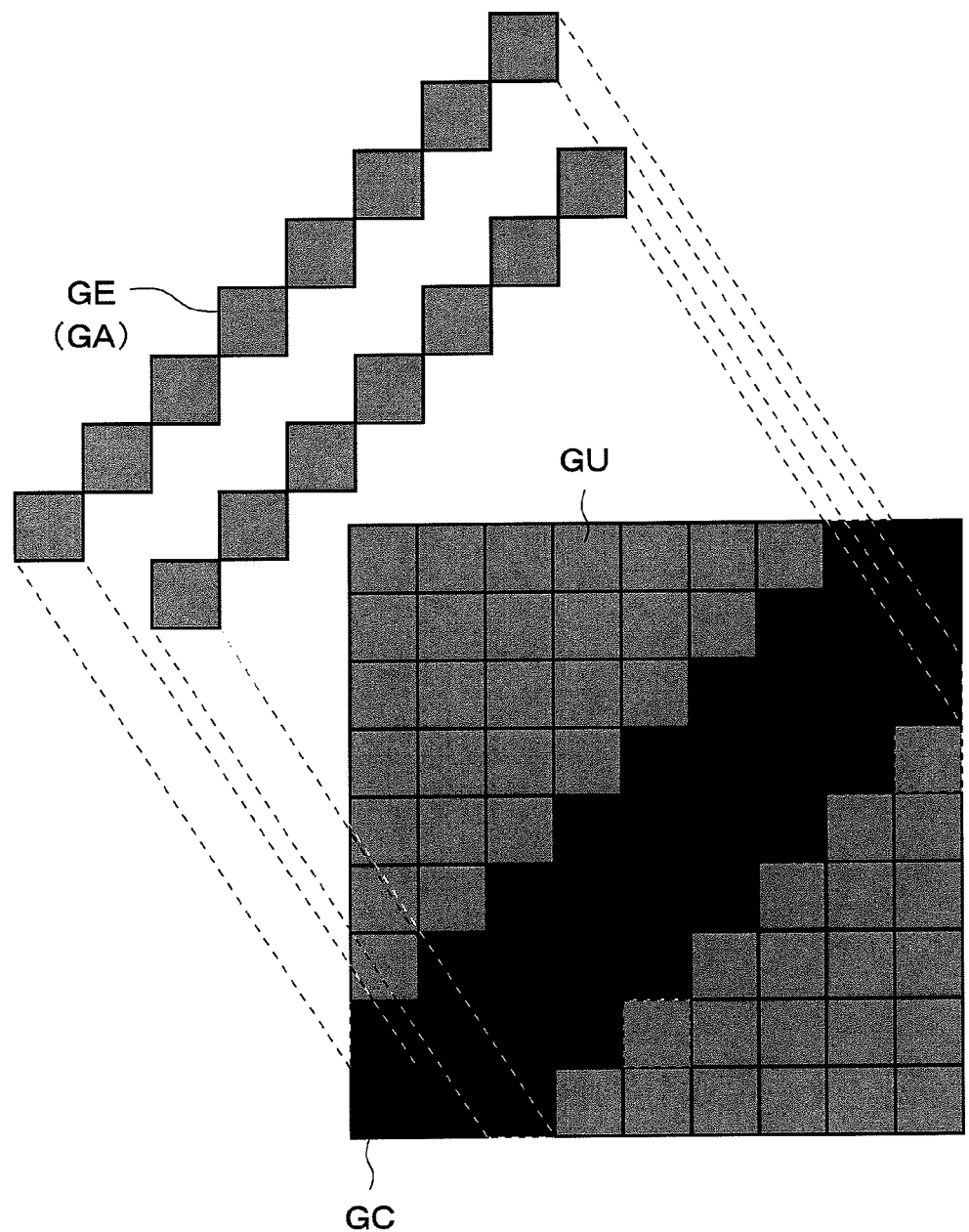
Figure 11:
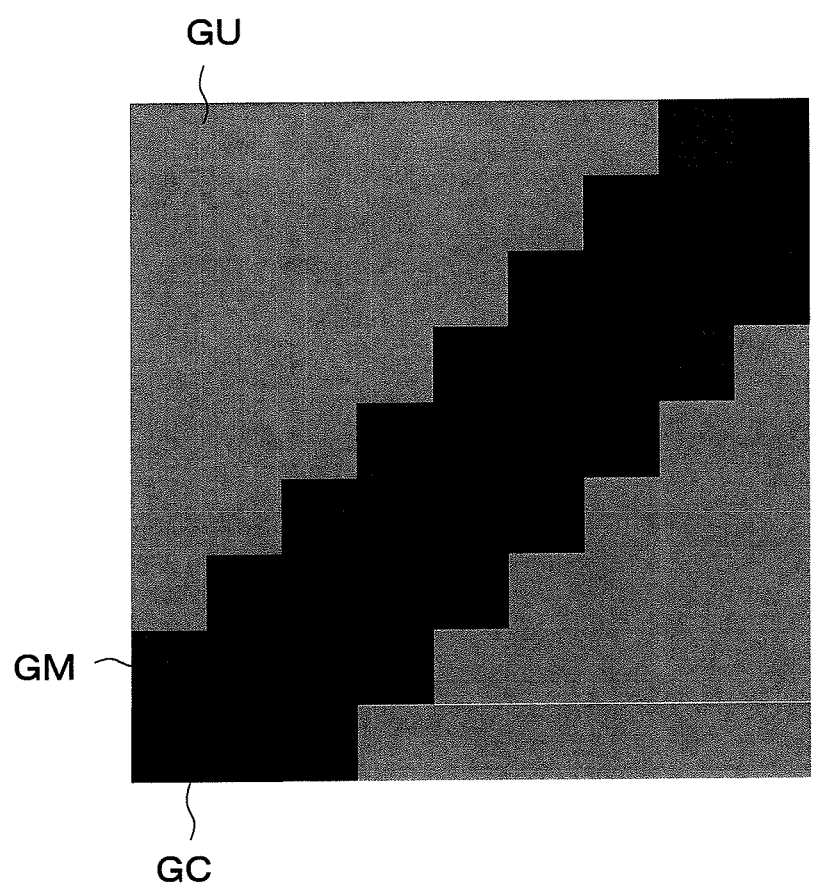
FIG. 11 is a diagram showing a condition in which an antialiasing image is superimposed in a semi-transparent state.

Next, in step S32, the edge image generation unit 45 extracts and generates an edge image GE from a character image GC (see FIG. 4) included in the region for which the antialiasing layer LA is to be generated (the base region of a specific color). For example, the edge image GE as shown in FIG. 7 is extracted. As shown in FIG. 10, the edge image GE is an image that is configured using, from among the pixels of the character image GC shown in FIG. 9, pixels of an inner edge region of the character image. The edge image GE is extracted as a binarized image. Here, FIGS. 9 to 11 are diagrams showing, in enlarged scale, a part (oblique line portion) of the character image. Specifically, FIG. 9 is a diagram showing the original character image, and FIG. 10 is a diagram showing how the edge image GE is extracted. FIG. 11 is a diagram showing a state in which the antialiasing layer LA is superimposed on the character image layer LC, which will be discussed later.

Then, in step S33, the oblique-portion extraction unit 46 extracts only an oblique portion from the extracted edge image GE. For example, the oblique-portion extraction unit 46 extracts an oblique line portion using, for example, a filter FT1 as shown in FIG. 12. The filter FT1 is an M-by-M pixel size filter in which the center pixel and pixels that are aligned in upper right and lower left directions from the center pixel have a pixel value "1", and the other pixels have a pixel value "0". The filter FT1 is an image processing filter that calculates a large value for a line extending in the direction of inclination at a predetermined angle (in the present example, +45 degrees). At each position in the character image, if the result of calculation by the filter FT1 shows a predetermined value or more, the presence of an oblique line is detected. Note that although only the filter for detecting an oblique line with a predetermined angle (+45 degrees) is illustrated in FIG. 12, in actuality, an oblique line is detected using filters for multiple angles (e.g., +45 degree, −45 degree, +30 degree, −30 degree, +60 degree, and −60 degree).

Furthermore, in step S34, the antialiasing layer generation unit 35 generates an antialiasing image GA based on the edge image GE generated by the edge image generation unit 45.

Figure 8:
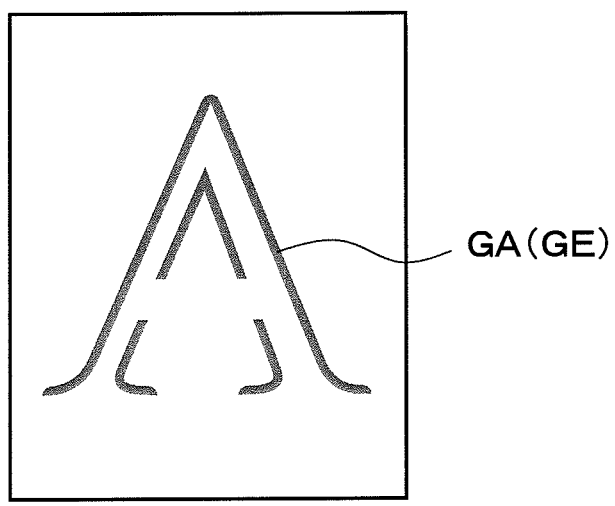
FIG. 8 is a diagram showing an antialiasing image obtained after removal of a horizontal portion.

Here, the antialiasing layer generation unit 35 generates the antialiasing image GA by extracting, from the edge image GE, only an "oblique line portion" that has been detected by the oblique-portion extraction unit 46. In other words, the antialiasing image GA is generated by excluding a "horizontal portion" (a pixel group having a pixel value "1" and being continuous in the horizontal direction) and a "vertical portion" (a pixel group having a pixel value "1" and being continuous in the vertical direction) from the edge image GE generated by the edge image generation unit 45. For example, mainly a horizontal portion is removed from the edge image GE as shown in FIG. 7, and an antialiasing image GA as shown in FIG. 8 is generated.

This enables a reduction in the number of places where the pixel value changes from "0" to "1" in the antialiasing image GA. Accordingly, in the case of using a compression technique such as run-length compression in the data compression processing (step S16 in FIG. 3), it is possible to particularly improve the compression rate and to thereby reduce the data amount. Note that the exclusion of the "horizontal portion" particularly greatly improves the compression rate in run-length compression performed in the longitudinal direction (vertical direction), and the exclusion of the "vertical portion" particularly greatly improves the compression rate in run-length compression performed in the lateral direction (horizontal direction). By excluding both the "horizontal portion" and the "vertical portion", it is possible to improve the compression rate with stability in either case where run-length compression is performed in the longitudinal direction or in the lateral direction.

Note that the case where the antialiasing image GA is configured by only the "oblique line portion" in the edge image GE is illustrated in the present example, the present invention is not limited thereto. For example, the edge image GE generated by the edge image generation unit 45 may be determined as-is as the antialiasing image GA.

For the antialiasing image (binarized image) GA, the antialiasing layer generation unit 35 sets the same color as the base color detected in step S31 as color information of the antialiasing layer LA. For example, in the case where the base color is "cyan", the color information of the antialiasing layer LA is set to "cyan". In the case where the base color is white, the color information of the antialiasing layer LA is set to "white".

Furthermore, the antialiasing image GA in the antialiasing layer LA is set as a semi-transparent image having a predetermined transmittance α (here, 50%). Note that the transmittance a is not limited to 50% and may be set to another value (such as 30% or 70%). It is sufficient that the transmittance a is a value greater than 0% and less than 100%. The "semi-transparent image" is an image for which the transmittance a is set as described above, and is not limited to an image having a transmittance of 50%.

In this way, the antialiasing layer generation unit 35 generates the antialiasing layer LA based on the antialiasing image GA. The antialiasing layer LA is also referred to as a "semi-transparent layer" since it is a layer superimposed in a semi-transparent state on the character image layer LC.

Then, the data DT indicating the character area is generated using the antialiasing layer LA, the character image layer LC, the base layer LU, and the like described above. Then, the file FL is generated using the data DT (see also steps S16 and S19 in FIG. 3 or the like).

When the generated file FL is displayed, the antialiasing layer LA is displayed superimposed on the base layer LU and the character image layer LC.

For example, in FIG. 4 (see also FIGS. 9 and 10), an opaque and black character image layer LC is superimposed on a "cyan" base layer LU, and a "cyan" and semi-transparent antialiasing layer LA is further superimposed on both of the layers LU and LC. In the example shown in FIG. 4 or the like, the cyan pixels, where (R, G, B)=(0, 255, 255), of the antialiasing image GA in the antialiasing layer LA are superimposed with a predetermined transmittance α (here, 50%) on the black pixels, where (R, G, B)=(0, 0, 0), of the inner edge region of the character image GC. As a result, as shown in FIG. 11, pixels GM of the inner edge region of the character image GC have RGB values of 0, 128, and 128, respectively. That is, the pixels GM in which the base color of "cyan" and the character color of "black" are composited in a transmissive manner with the transmittance a are generated in the inner edge region of the character image GC. In other words, the pixels GM having a halftone value are rendered on both inner sides of the oblique portion of the character. This reduces jaggies on the oblique portion of the character.

Figure 14:
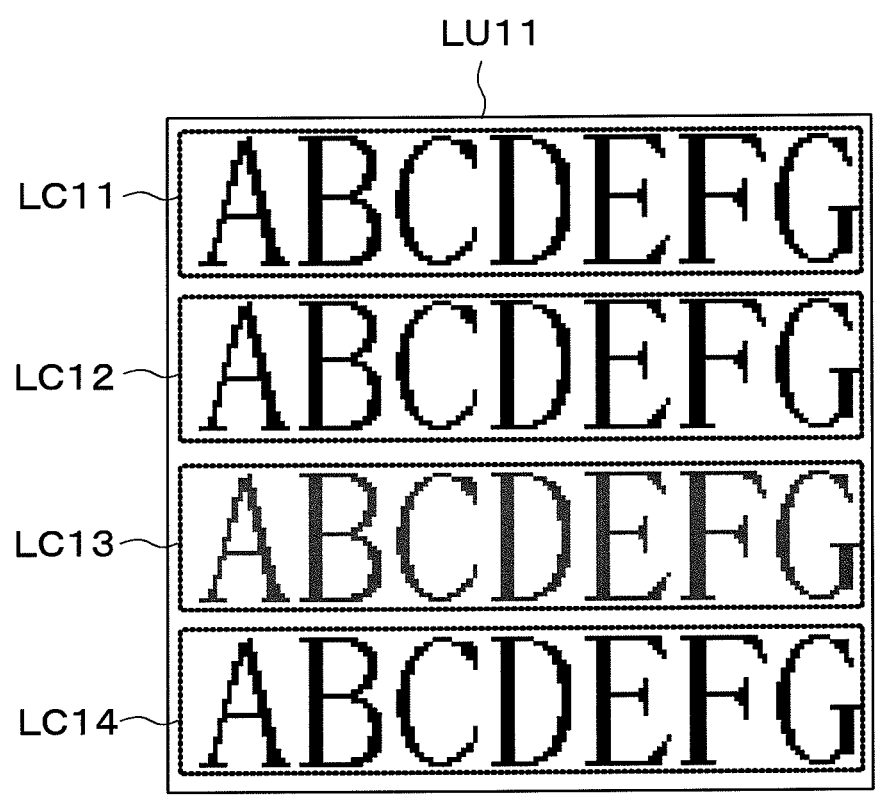
FIG. 14 is a diagram showing another example (an example of display in which four types of opaque and colored character image layers are superimposed on a white base layer).
Figure 15:
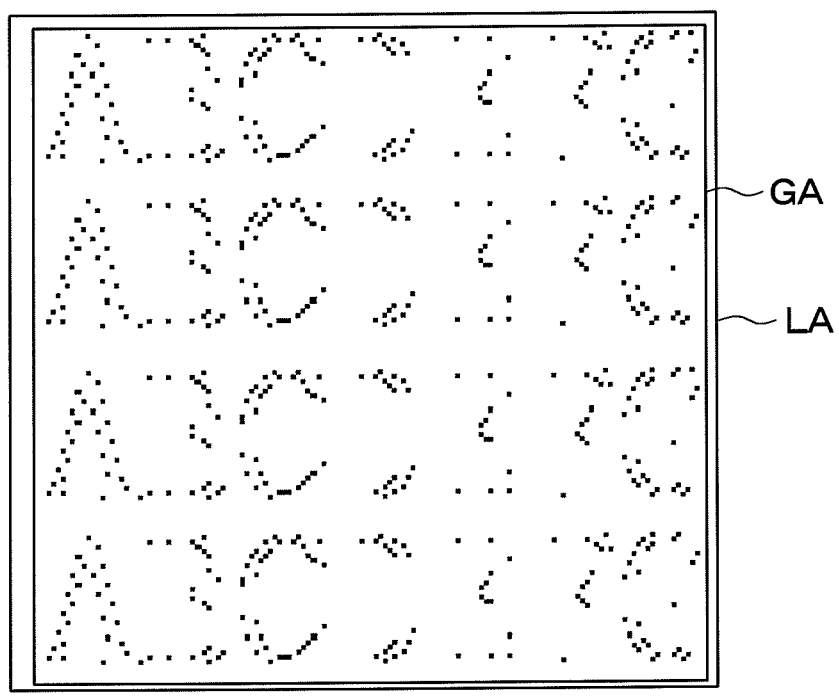
FIG. 15 is a diagram showing an antialiasing layer.
Figure 16:
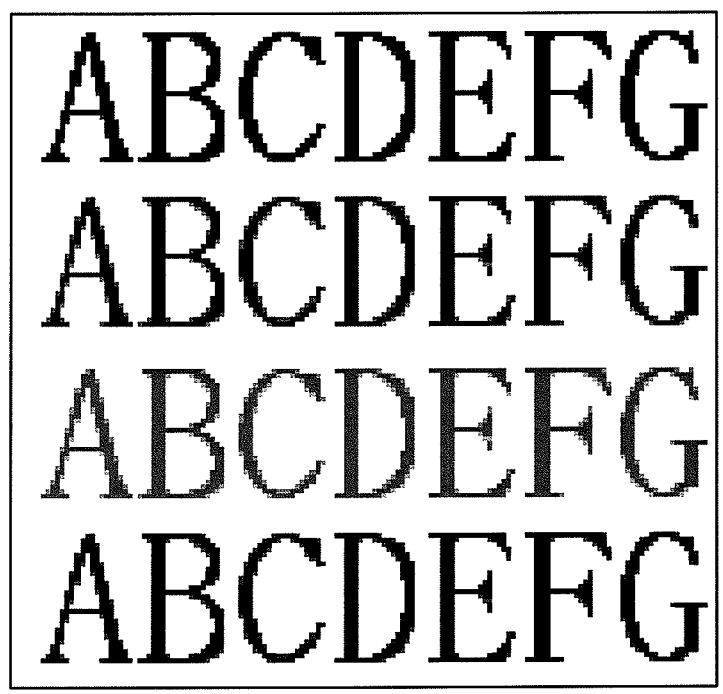
FIG. 16 is a diagram showing a state in which the antialiasing layer shown in FIG. 15 is superimposed on the layers shown in FIG. 14.
Figure 17:
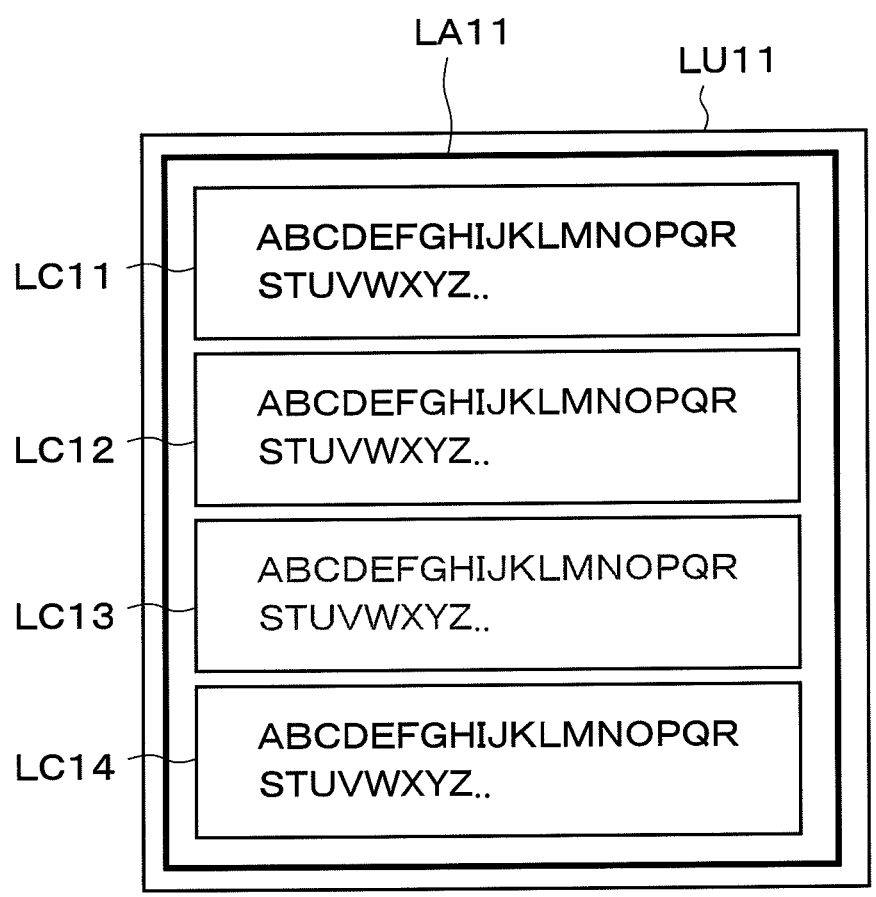
FIG. 17 is a diagram showing a condition in which a common antialiasing layer is applied to multiple character image layers.

FIGS. 14 to 16 are diagrams showing another example. FIG. 17 is a diagram showing the relationship of the layers LU, LC, and LA in a similar example. Note that characters "ABCDEFG" in the character image layers LC11 to LC14 in FIGS. 14 to 16 conceptually indicate that "characters" are to be displayed. The same applies to characters "ABCDEFGHIJKLMNOPQRSTUVWXYZ" in the layers LC11 to LC14 in FIG. 17.

FIG. 14 is a diagram showing an example of display in which four types of opaque and colored character image layers LC11 to LC14 are superimposed on a white base layer LU11. These character image layers LC11, LC12, LC13, and LC14 are generated based on multiple character image regions that have the same base color (white) but have different character colors (in the present example, black, red, green, and blue, respectively). Also, a different character color is set for each of the character image layers LC11, LC12, LC13, and LC14. It is assumed here that the four types of character image layers LC11, LC12, LC13, and LC14 have black, red, green, and blue character colors, respectively.

FIG. 15 is a diagram showing the antialiasing layer LA generated as described above. In FIG. 15, for the convenience of drawing, the antialiasing image GA in the antialiasing layer LA is illustrated as a collection of points having a color (light color) different from white, but in actuality, the "color" of the antialiasing layer LA is white since it is set to the same color as the base color (here, white).

FIG. 16 is a diagram showing an example of display in which the four types of opaque and colored character image layers LC11 to LC14 are superimposed on the white base layer LU11, and a white and semi-transparent antialiasing layer LA11 (FIG. 15) is further superimposed thereon. That is, FIG. 16 shows a state in which the file FL is displayed.

In FIG. 16, as can be seen from a comparison with FIG. 14, pixels having a halftone value are rendered on both inner sides of the oblique portions of characters by the action of the antialiasing layer LA (see FIG. 15), which reduces jaggies on the oblique portions of the characters.

As described above, according to the above embodiment, the antialiasing layer LA is generated as a layer that includes a binarized image based the edge images of characters and that is to be superimposed in a semi-transparent state on the character image layer LC. Accordingly, in a state in which the character image layer LC and the antialiasing layer LA are superimposed one above the other, it is possible to generate a halftone value in the vicinity of the edge portions of the characters and to thereby reduce jaggies on the edge portions. In particular, the antialiasing layer LA that is generated as a "binarized image" based on the edge images of characters enables suppression of an increase in the data amount (increase in file size).

In particular, in the case where multiple character image layers LC (LC11 to LC14), each having a different character color, are present on a common base-color (e.g., white) base layer LU (LU11) as shown in FIGS. 14 and 17, it is preferable that a single antialiasing layer LA (LA11) is commonly applied to the multiple character image layers LC. Specifically, it is preferable that a single common antialiasing layer LA (LA11) having a common color (base color) is generated for and applied to multiple character image layers LC. In other words, it is preferable that a single antialiasing layer is commonly applied to multiple character image layers regarding multiple character image regions that have the same base color and each have a different character color. This also achieves the aforementioned effect. Also, in this case, it is not necessary to provide an antialiasing layer LA for each of multiple character image layers LC (that is, to provide multiple antialiasing layers LA). Accordingly, an increase in the amount of the header information of the antialiasing layer LA can be suppressed as compared to the case where multiple antialiasing layers LA are provided. Therefore, it is possible to suppress an increase in the data amount.

Figure 13:
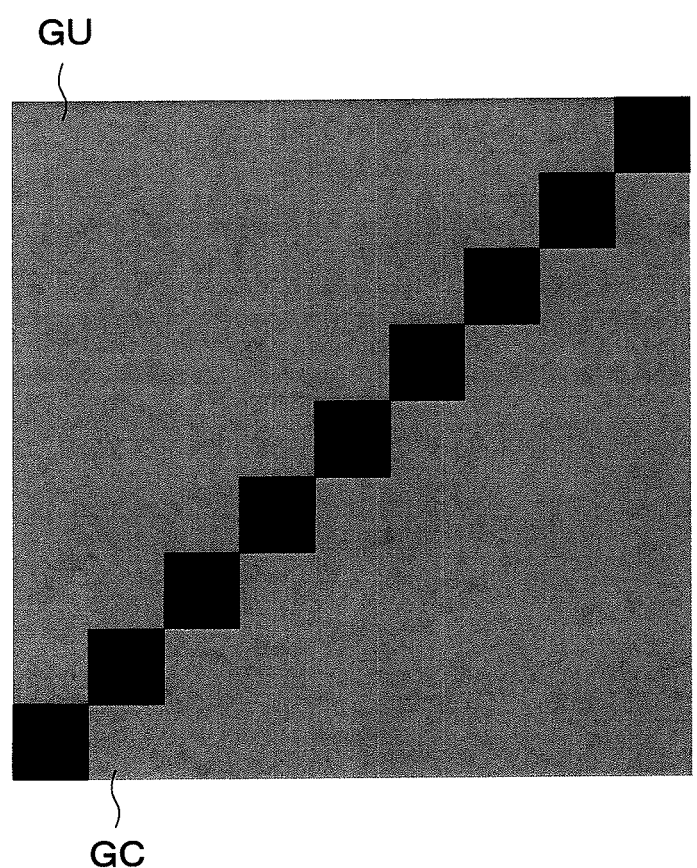
FIG. 13 is a diagram showing a thin-line portion of a character.
Figure 19:
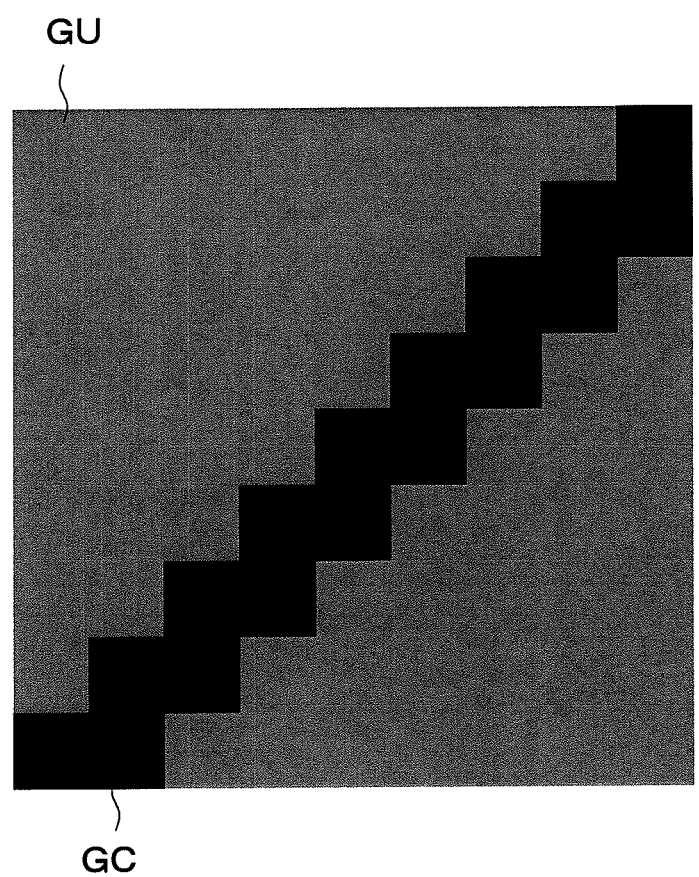
FIG. 19 is a diagram showing part of a character image.

Note that in the above-described embodiment, a case is illustrated in which the processing of steps S32 to S34 is performed in the same manner irrespective of the line width of the character image GC, but the present invention is not limited thereto. For example, in the case where the character image GC includes a thin line (a thin line having a width of the order of one pixel or two pixels) as shown in FIG. 13 (or FIG. 19), processing for thickening the line width of a character, namely, "thickening processing", may be performed on the original character image GC so as to generate a new character image GC (see FIG. 9). Furthermore, the processing of steps S32, S33, and S34 may be performed on the new character image GC that has undergone such thickening processing. Such thickening processing or the like may be performed by the thickening processing unit 44 (see FIG. 2) or the like.

If the thickening processing is not performed, when the antialiasing layer LA is superimposed on the character image layer LC, thin-line portions of characters are configured from only a halftone value, and therefore a situation can arise where the lines of the characters appear thinner (or, depending on the situation, they appear to have disappeared). On the other hand, according to the above-described modification involving the thickening processing, even in thin-line portions of characters, it is possible to, while leaving pixels of the characters having the original tone value in place, dispose pixels having a halftone value at adjacent positions of the pixels having the original tone value (see FIG. 11). Accordingly, jaggies can be reduced favorably.

Furthermore, in the above-described embodiment, a case is illustrated in which the base layer LU is generated as a binarized image of only a specific color (solid color image), but the present invention is not limited thereto. For example, the base layer LU may be configured from a multi-valued image (such as an image with a pattern). In this case, the antialiasing layer generation unit 35 may detect the principle color of the base (background) of characters as the base color and determine that base color as the color of the antialiasing layer LA. Alternatively, a multi-valued image or the like representing the base of characters may be configured as a compressed image in the JPEG format or the like.

Furthermore, in the above-described embodiment, a case is illustrated in which the antialiasing layer LA is generated for only character images included in the base layer LU with the largest area from among multiple base layers LU each having a different color, but the present invention is not limited thereto. For example, the antialiasing layer LA may be generated for each of multiple base layers LU each having a different color. However, limiting the number of antialiasing layers LA to be generated and the range of the generation of antialiasing layers LA as in the above-described embodiment further enables suppressing an increase in the data amount.

2. Second Embodiment

In the first embodiment described above, a case is illustrated in which the same color as the base color is set as the color (layer color) of the antialiasing layer LA is illustrated. A second embodiment describes a case where the same color as the character color is set as the color (layer color) of the antialiasing layer LA. The following description focuses on differences from the first embodiment.

Note that an antialiasing layer LA whose layer color is set to be the same as the base color and thus depends on the base color as in the first embodiment is referred to also as a "base-color-dependent antialiasing layer". Also, an antialiasing layer LA whose layer color is set to be the same as the character color and thus depends on the character color as in the second embodiment is referred to also as a "character-color-dependent antialiasing layer".

Figure 18:
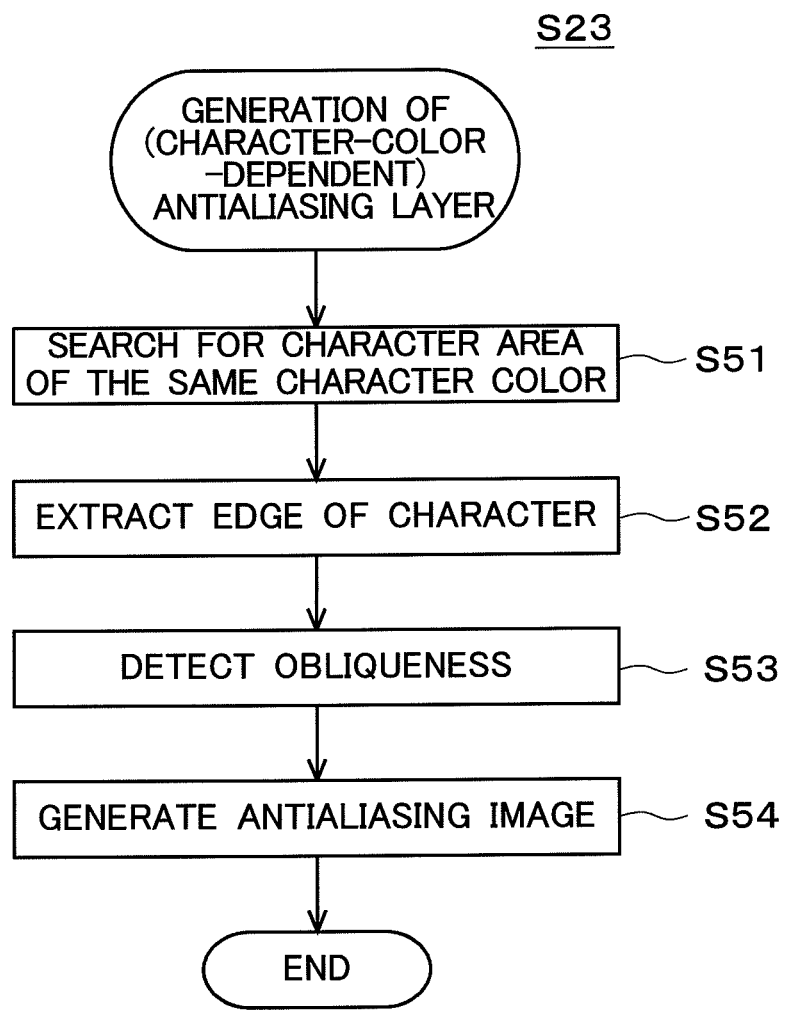
FIG. 18 is a flowchart showing processing for generating an antialiasing layer according to a second embodiment.

In the second embodiment, processing shown in FIG. 18 is executed in step S23 (FIG. 5), in place of the processing shown in FIG. 6.

In the second embodiment, the antialiasing layer generation unit 35 generates a single antialiasing layer LA for a single character image layer LC configured by characters of the same color. To be more specific, in the case where there are multiple character image layers LC (character image regions) each having a different color, the antialiasing layer LA is generated for only character images included in the character image layer LC with the largest area (also referred to as the "largest character image layer" or the "largest character image region") from among the character image layers LC.

Accordingly, first in step S51 (FIG. 18), the antialiasing layer generation unit 35 searches for a character image region of the same color using the character color determination unit 42, and determines a region for which the antialiasing layer LA is to be generated. More specifically, the antialiasing layer generation unit 35 selects the character image layer LC with the largest area ("the largest character image layer") from among one or more character image layers LC each having a different color. Then, only the selected character image layer LC is determined as a region (target region for generation) for which the antialiasing layer LA is to be generated. The antialiasing layer generation unit 35 also detects the character color of the selected character image layer LC (in other words, the character color of character images in that character image layer LC). As described later, that character color (e.g., black) is set as the color information of the antialiasing layer LA.

Figure 20:
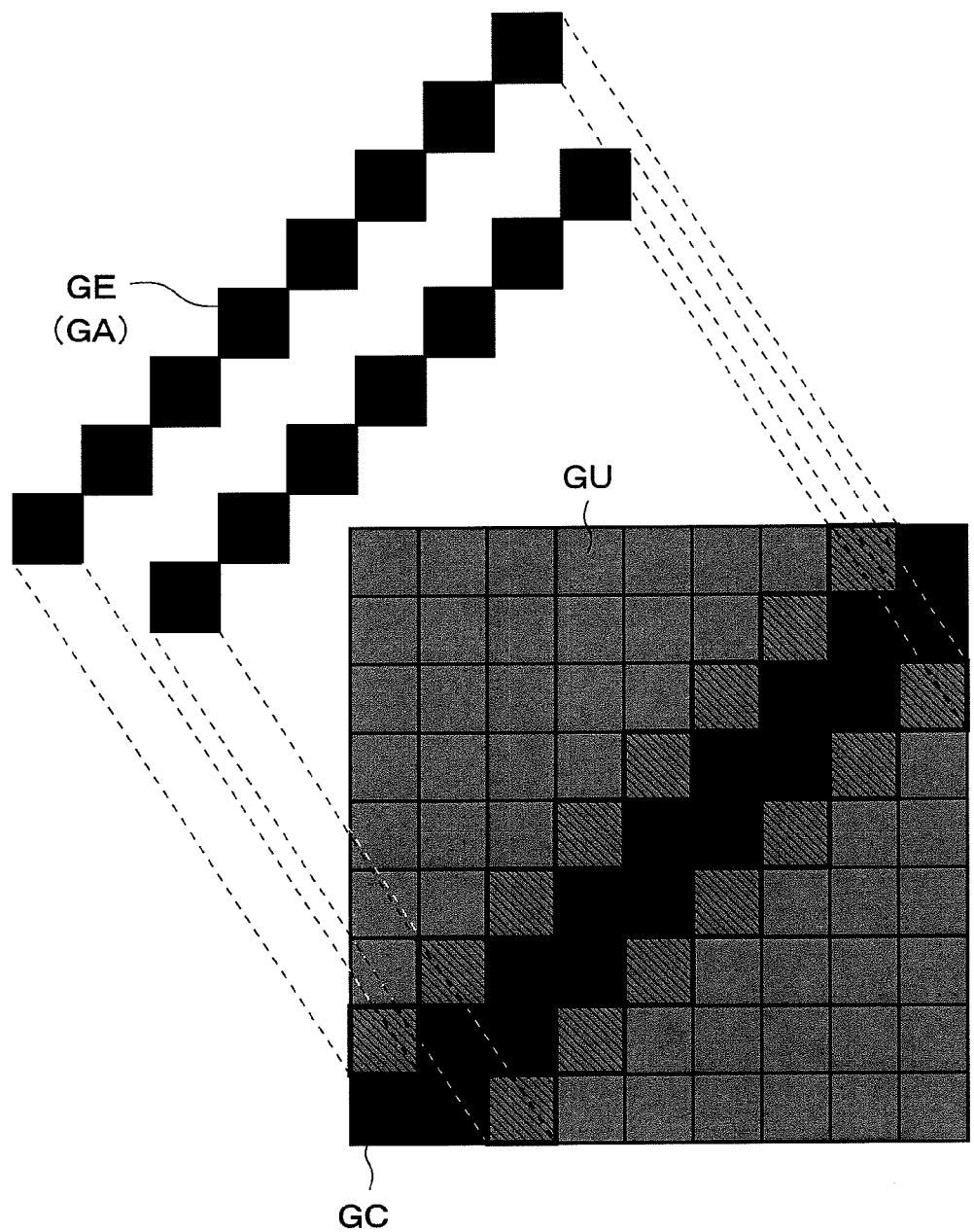

Next, the edge image generation unit 45 generates an edge image GE based on a character image GC included in the region for which the antialiasing layer LA is to be generated (the character image region of a specific color) (step S52). As shown in FIG. 20, in the second embodiment, the edge image GE is an image configured by pixels (diagonally hatched pixels in the figure) located externally adjacent to the pixels of the character image GC (see FIG. 19), i.e., an image configured by pixels located externally adjacent to the edge region of the character image GC. The edge image GE is generated as a binarized image.

In the next step S53, processing similar to that of step S33 is executed.

Thereafter, the antialiasing layer generation unit 35 generates the antialiasing image GA based on the edge image GE generated by the edge image generation unit 45 (step S54). Note that, as described above, it is more preferable for the antialiasing layer generation unit 35 to generate the antialiasing image GA by further extracting only an "oblique line portion" from the edge image GE generated by the edge image generation unit 45, using the oblique-portion extraction unit 46.

In the second embodiment, for the antialiasing image (binarized image) GA, the antialiasing layer generation unit 35 sets the same color as the character color detected in step S51 as the color information (layer color) of the antialiasing layer LA. For example, in the case where the character color is black, the color information of the antialiasing layer LA is set to "black".

Furthermore, the antialiasing image GA in the antialiasing layer LA is set as a semi-transparent image having a predetermined transmittance α (here, 50%).

In this way, the antialiasing layer generation unit 35 generates the antialiasing layer LA (character-color-dependent antialiasing layer) based on the antialiasing image GA.

Then, a file FL is generated using the antialiasing layer LA, the character image layer LC, the base layer LU, and the like described above.

When the generated file FL is displayed, the antialiasing layer LA is displayed superimposed on the base layer LU and the character image layer LC.

Figure 21:
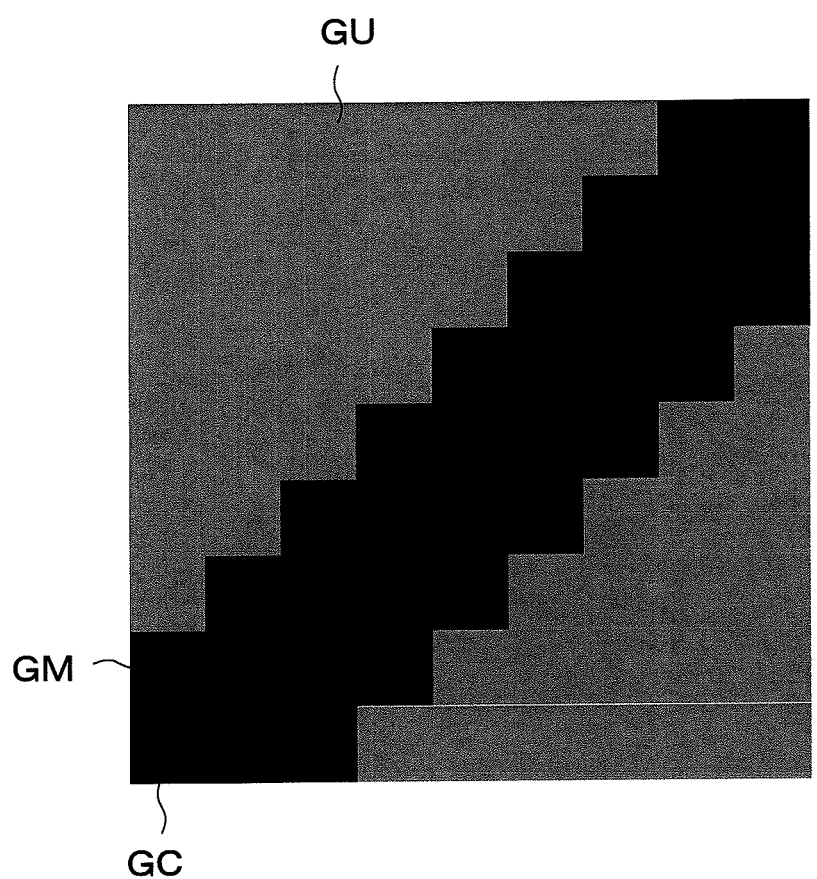
FIG. 21 is a diagram showing a condition in which an antialiasing image is superimposed in a semi-transparent state.

FIG. 21 is a diagram showing an example of display in which an opaque and black character image layer LC is superimposed on a "cyan" base layer LU, and a black and semi-transparent antialiasing layer LA is further superimposed thereon. In the example shown in FIG. 21, the black pixels, where (R, G, B)=(0, 0, 0), of the antialiasing image GA in the antialiasing layer LA are superimposed with a predetermined transmittance α (here, 50%) on the pixels ("cyan" pixels), where (R, G, B)=(0, 255, 255), located externally adjacent to the edge region of the character image GC (diagonally hatched pixels in FIG. 20). As a result, as shown in FIG. 21, the pixels located externally adjacent to the edge region of the character image GC have RGB values of 0, 128, and 128, respectively. That is, the pixels in which the base color of "cyan" and the character color of "black" are composited in a transmissive manner with the transmittance α are generated in the portion located externally adjacent to the edge region of the character image GC. In other words, the pixels GM having a halftone value are rendered on both outer sides of the oblique portion of the character. This reduces jaggies on the oblique portion of the character.

Note that, in the second embodiment, unlike in the first embodiment, the pixels with a halftone value generated by the superimposition of the antialiasing layer LA are rendered outside the character image GC (specifically, outside the edge region of the character image GC). Accordingly, it is possible, without involving the thickening processing, to reduce jaggies favorably even in thin-line portions of characters.

Figure 22:
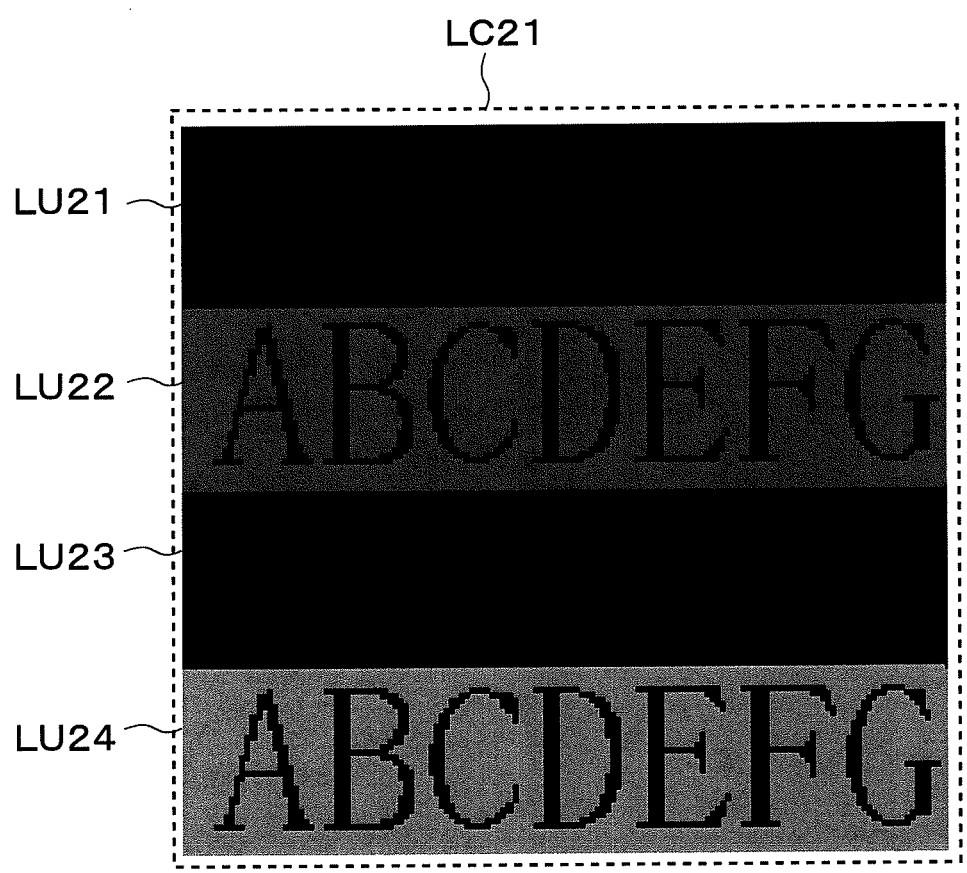
FIG. 22 is a diagram showing an example of display in which a single character image layer is superimposed on four base layers.
Figure 23:
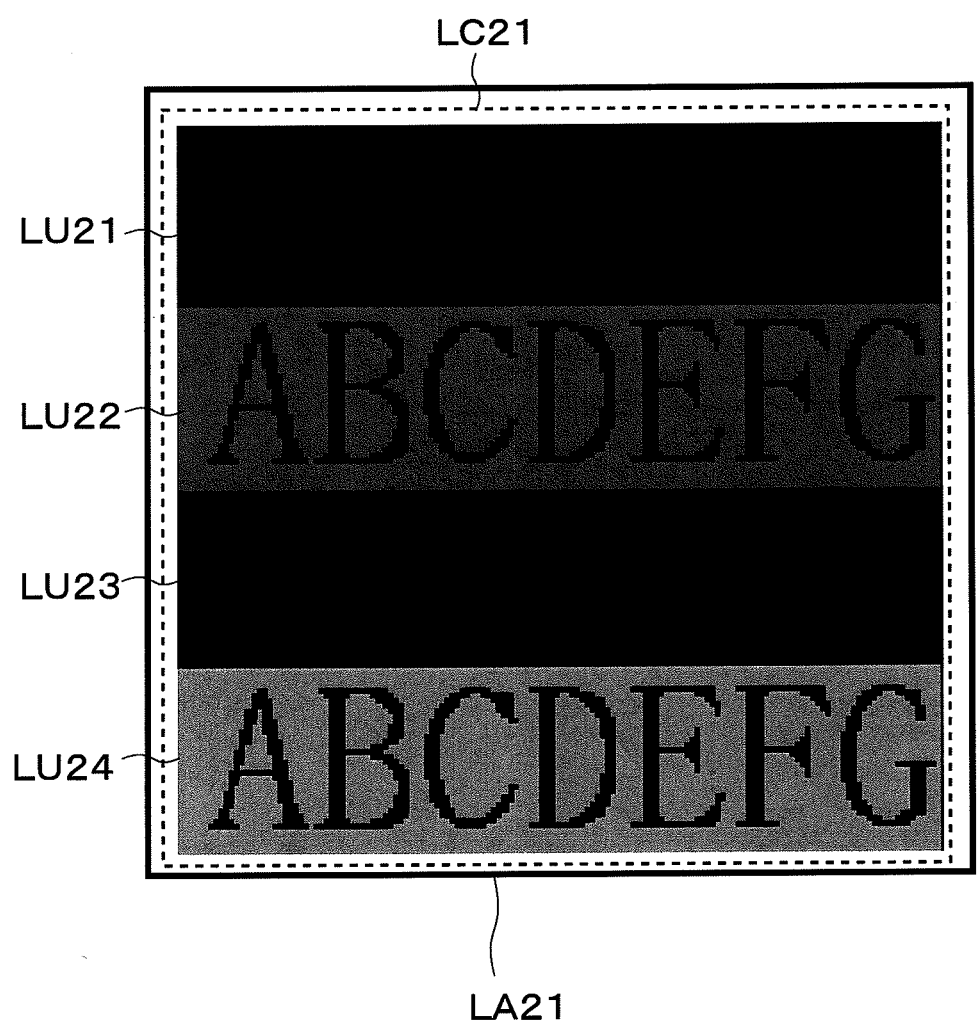
FIG. 23 is a diagram showing a state in which an antialiasing layer is superimposed on the layers shown in FIG. 22.

FIGS. 22 and 23 are diagrams showing another example.

FIG. 22 is a diagram showing an example of display in which a single opaque and colored (black) character image layer LC21 is superimposed on four base layers LU21 to LU24. It is assumed that the four types of base layers LU21, LU22, LU23, and LU24 have red, green, blue, and gray base colors, respectively.

FIG. 23 is a diagram showing a state in which an antialiasing layer LA generated as described above is further superimposed on the above layers. In FIG. 23, the single opaque and colored (black) character image layer LC21 is superimposed on the four base layers LU21 to LU24, and a black and semi-transparent antialiasing layer LA21 is further superimposed thereon.

In FIG. 23, as can be seen from a comparison with FIG. 22, pixels having a halftone value are rendered on both sides of the oblique portions of characters by the action of the antialiasing layer LA, which reduces jaggies on the oblique portions of the characters.

As described above, according to the second embodiment described above, the antialiasing layer LA is generated as a layer that includes a binarized image based on the edge images GE of characters and that is to be superimposed in a semi-transparent state on the character image layer LC. Accordingly, in a state in which the character image layer LC and the antialiasing layer LA are superimposed one above the other, it is possible to generate pixels having a halftone value in the vicinity of the edge portions of characters and to thereby reduce jaggies on the edge portions. In particular, the antialiasing layer LA that is generated as a binarized image enables suppression of an increase in the data amount.

In particular, in the case where a character image layer LC (LC21) of a certain character color is present on multiple base layers LU (LU21 to LU24) each having a different base color as shown in FIG. 23, it is preferable that a single common antialiasing layer LA (LA21) having a common color (character color) is generated for and applied to the multiple base layers LU. In other words, it is preferable that a single antialiasing layer is commonly applied to multiple character image regions that have the same character color but each have a different base color (specifically, multiple character image regions (that correspond to the respective base colors) in the character image layer LC21). This also achieves the aforementioned effect. Also, in this case, it is not necessary to provide an antialiasing layer for each base region having a different base color. In other words, it is not necessary to provide an antialiasing layer LA for each of multiple base layers LU (that is, to provide multiple antialiasing layers LA). Accordingly, an increase in the amount of the header information of the antialiasing layer LA can be suppressed as compared to the case where multiple antialiasing layers LA are provided. Therefore, it is possible to suppress an increase in the data amount.

Note that in the above embodiment, a case is illustrated in which the antialiasing layer LA is generated for only character images included in the character image layer LC with the largest area from among multiple character image layers LC each having a different color, but the present invention is not limited thereto. For example, the antialiasing layer LA may be generated for each of multiple character image layers LC each having a different color. However, limiting the number of antialiasing layers LA to be generated and the range of the generation of antialiasing layers LA as in the above-described embodiment further enables suppressing an increase in the data amount.

3. Third Embodiment

A third embodiment describes a case where two types of antialiasing layers LA, namely, a "base-color-dependent antialiasing layer" (see the first embodiment) and a "character-color-dependent antialiasing layer" (see the second embodiment), are selectively used.

In the third embodiment, the antialiasing layer generation unit 35 selectively generates one of the above-described two types of antialiasing layers LA for each page of the file FL.

Figure 24:
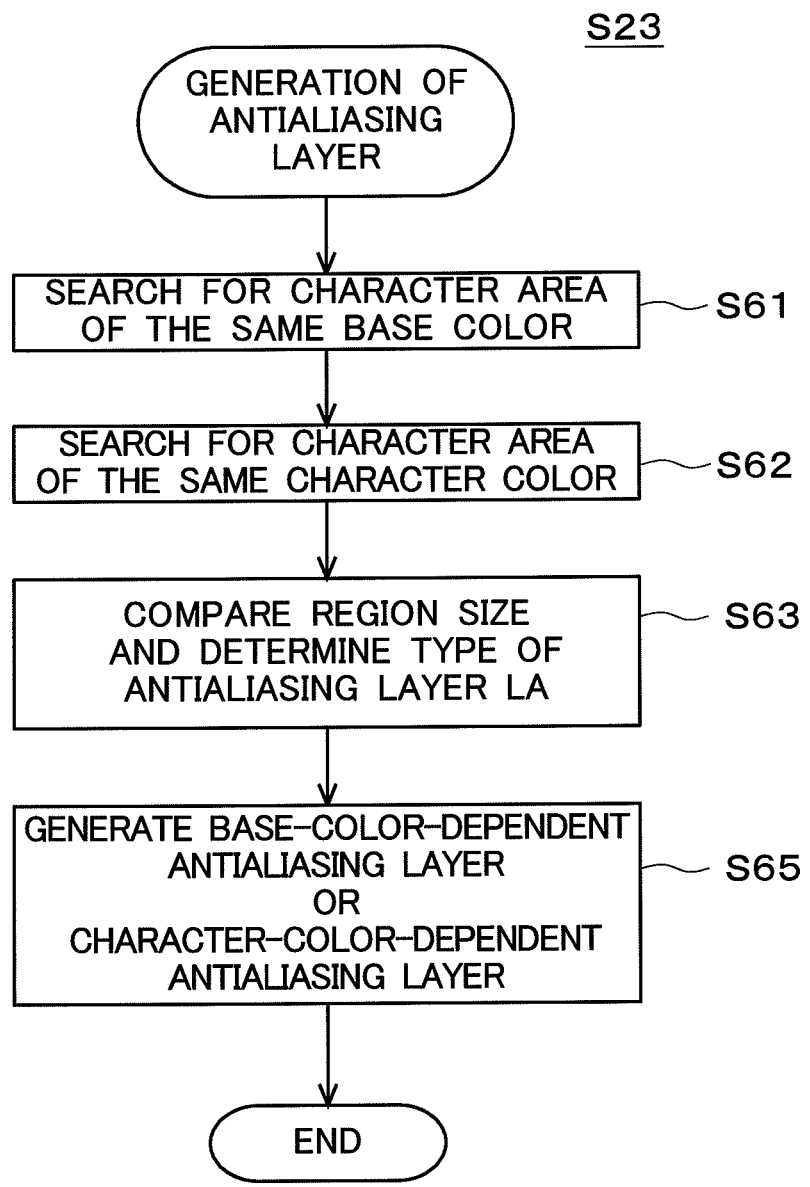
FIG. 24 is a flowchart showing part of operations according to a third embodiment.

Specifically, processing shown in FIG. 24 is executed in step S23 (FIG. 5), in place of the processing shown in FIG. 6. FIG. 24 is a flowchart showing part of operations according to the third embodiment.

First, in step S61, the antialiasing layer generation unit 35 detects the base color of the character area (character image region) and searches for a base region of a specific color, and also determines the largest base region of the same color (largest base region) from one or more base regions.

Next, in step S62, the antialiasing layer generation unit 35 detects the character color of a character image region and searches for a character image region of a specific color, and also determines the largest character image region of the same color (the largest character image region) from among one or more character image regions.

Thereafter, in step S63, the largest base region and the largest character image region are compared so as to determine that the antialiasing layer LA to be generated is of the type corresponding to the one of the largest base region and the largest character image region that has a relatively larger area. For example, if the largest base region is larger than the largest character image region, it is determined that a "base-color-dependent antialiasing layer" is to be generated. On the other hand, if the largest character image region is larger than the largest base region, it is determined that a "character-color-dependent antialiasing layer" is to be generated.

Then, an antialiasing layer LA is generated in step S65.

Specifically, if the "base-color-dependent" type is determined as the type of antialiasing layer LA in step S63, processing similar to that of the first embodiment (in particular, steps S32 to S34) is performed so as to generate a "base-color-dependent antialiasing layer". To be more specific, the "base-color-dependent antialiasing layer" is generated for only the "largest base region" of the character area.

On the other hand, if the "character-color-dependent" type is determined as the type of antialiasing layer LA in step S63, processing similar to that of the second embodiment (in particular, steps S52 to S54) is performed so as to generate a "character-color-dependent antialiasing layer". Specifically, the "character-color-dependent antialiasing layer" is generated for only the "largest character image region" of the character area.

Figure 25:
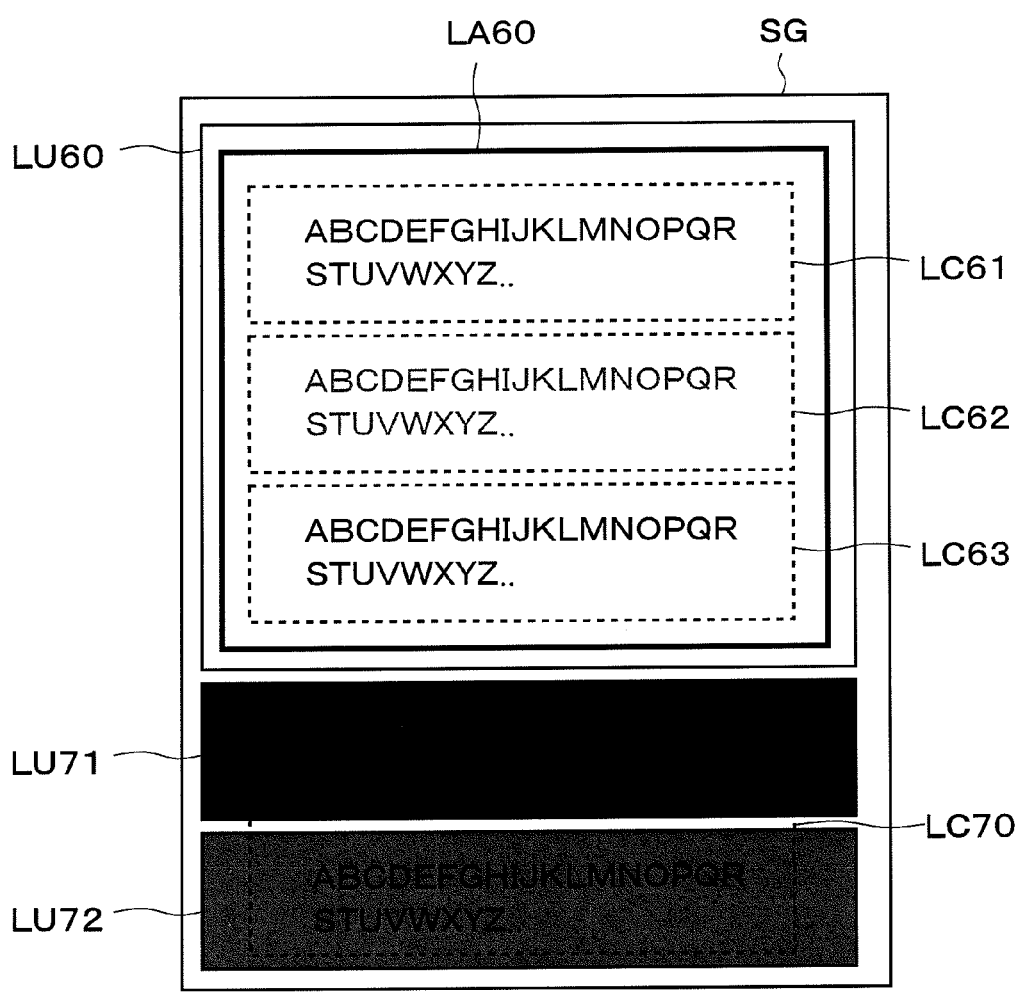
FIG. 25 is a diagram showing another example of a scanned image.

As shown in FIG. 25, if the largest base region LU60 (e.g., a white base region) is larger than the largest character image region LC70 (a black character image region) in a page image (scanned image) SG, a base-color-dependent antialiasing layer LA is generated in the same manner as in the first embodiment. Specifically, the "base-color-dependent antialiasing layer" LA (LA60) is generated for only the largest base region LU60 of the character area. In this case, no antialiasing layer LA is generated for the largest character image region LC70, which enables suppression of the file capacity.

Note that although the present example illustrates a case in which a "base-color-dependent antialiasing layer" or a "character-color-dependent antialiasing layer" is selectively generated, the present invention is not limited thereto. For example, the "base-color-dependent antialiasing layer" and the "character-color-dependent antialiasing layer" may be both generated. Specifically, in FIG. 25, a "base-color-dependent antialiasing layer" LA1 may be generated for the largest base region LU60 (white base region), and a "character-color-dependent antialiasing layer" LA2 may be generated for the largest character image region LC70 (black character image region). To be more specific, the "base-color-dependent antialiasing layer" LA1 may be generated as a white antialiasing layer common to three character image regions LC61, LC62, and LC63. Also, the "character-color-dependent antialiasing layer" LA2 may be generated as a black antialiasing layer LA common to two base regions LU71 and LU72.

4. Modifications

The above has been a description of preferred embodiments of the present invention, but the present invention is not intended to be limited to the content described above.

For example, in the above embodiments, a case is illustrated in which each character image layer LC is configured as a layer that represents character images included therein in binary, but the present invention is not limited thereto. A configuration is also possible in which the character image layer LC is configured as a layer that represents the pixels of the character images by three or more values.

Although the above embodiments describe the case where the MFP 1 alone constitutes the electronic document generation system, the present invention is not limited thereto, and an electronic document generation system may be constituted by multiple devices.

Figure 26:
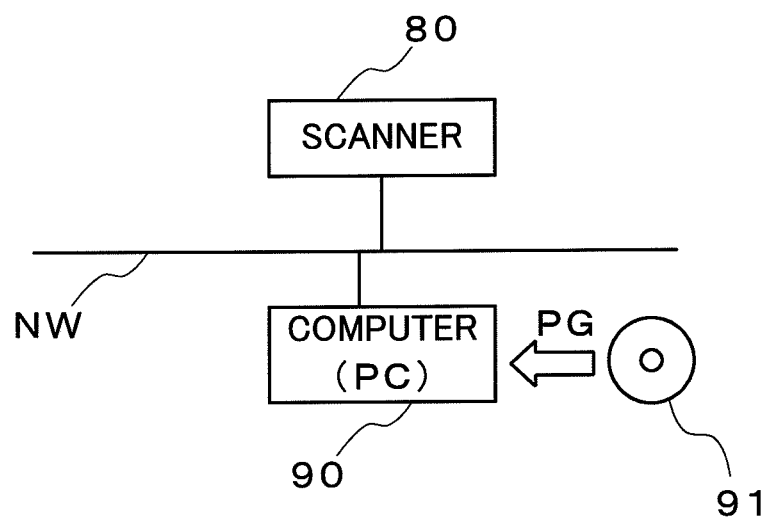

FIG. 26 is a schematic diagram showing an electronic document generation system 100 (100B) according to such a modification. Here, the electronic document generation system 100B includes a scanner device 80 and a computer (such as a personal computer) 90. Note that the scanner device 80 may be a scanner-only device, or may be a multi-function device such as the aforementioned MFP 1.

The computer 90 is communicatively connected to the scanner device 80 via a communication network NW. The computer 90 receives a scanned image generated by the scanner device 80 via the communication network NW and performs image processing as described above on the scanned image.

Specifically, the computer 90 reads out predetermined programs PG from various types of portable (or non-transitory) computer-readable recording media 91 (such as a USB memory device, a CD-ROM, or a DVD-ROM) on which these programs have been recorded, and executes the programs PG using its CPU or the like, so that functions similar to those of the above-described controller 9 are implemented. Note that the programs PG may be supplied from the recording media, or, for example, may be downloaded via the Internet.

This enables the computer 90 to implement image processing or the like similar to that in the above-described embodiments. In particular, this computer 90 is capable of creating a file FL (e.g., a PDF file) as described above based on the image transmitted from the scanner device 80.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An electronic document generation system for generating an electronic document based on a scanned image, comprising:
   a first layer generation unit configured to generate a character image layer that represents a character image in the scanned image by a predetermined number of bits;
   an edge image generation unit configured to generate an edge image of the character image;
   a second layer generation unit configured to generate an antialiasing layer that includes a binarized image generated based on the edge image and that is to be superimposed in a semi-transparent state on the character image layer;
   a file generation unit configured to generate the electronic document that includes the character image layer and the antialiasing layer; and
   a base color determination unit configured to determine a base color of the character image,
   wherein the second layer generation unit sets the same color as the base color for the antialiasing layer.

2. The electronic document generation system according to claim 1, further comprising:
a character color determination unit configured to determine a character color of each character image region in the scanned image,
wherein the second layer generation unit generates the antialiasing layer as a layer that is commonly applied to a plurality of character image regions that have the same base color and each have a different character color.

3. The electronic document generation system according to claim 1, wherein the binarized image is configured using pixels of an inner edge region of the character image.

4. The electronic document generation system according to claim 3, wherein the first layer generation unit generates the character image layer based on an image obtained by performing thickening processing on the character image.

5. The electronic document generation system according to claim 1, wherein the second layer generation unit determines only a base region that has the largest area from among a plurality of base regions each having a different base color, as a target region for generation for which the antialiasing layer is to be generated.

6. The electronic document generation system according to claim 1, wherein the second layer generation unit generates the antialiasing layer using the binarized image that corresponds to an oblique portion of the edge image.

7. The electronic document generation system according to claim 1, wherein the predetermined number of bits is one bit.

8. An electronic document generation system for generating an electronic document based on a scanned image, comprising:
a first layer generation unit configured to generate a character image layer that represents a character image in the scanned image by a predetermined number of bits;
an edge image generation unit configured to generate an edge image of the character image;
a second layer generation unit configured to generate an antialiasing layer that includes a binarized image generated based on the edge image and that is to be superimposed in a semi-transparent state on the character image layer;
a file generation unit configured to generate the electronic document that includes the character image layer and the antialiasing layer; and
a character color determination unit configured to determine a character color of the character image,
wherein the second layer generation unit sets the same color as the character color for the antialiasing layer, and generates the antialiasing layer as a layer that is commonly applied to a plurality of character image regions that have the same character color and each have a different base color.

9. The electronic document generation system according to claim 8, wherein the binarized image is configured using pixels located externally adjacent to an edge region of the character image.

10. The electronic document generation system according to claim 8, wherein the second layer generation unit determines only a character image region that has the largest area from among a plurality of character image regions each having a different character color, as a target region for generation for which the antialiasing layer is to be generated.

11. An electronic document generation system for generating an electronic document based on a scanned image, comprising:
a first layer generation unit configured to generate a character image layer that represents a character image in the scanned image by a predetermined number of bits;
an edge image generation unit configured to generate an edge image of the character image;
a second layer generation unit configured to generate an antialiasing layer that includes a binarized image generated based on the edge image and that is to be superimposed in a semi-transparent state on the character image layer; and
a file generation unit configured to generate the electronic document that includes the character image layer and the antialiasing layer,
wherein the second layer generation unit determines a largest base region that is a base region having the largest area from among a plurality of base regions each having a different base color, and determines a largest character image region that is a character image region having the largest area from among a plurality of character image regions each having a different character color, and
the second layer generation unit generates the antialiasing layer for one of the largest base region and the largest character image region that has a larger area.

12. The electronic document generation system according to claim 11, wherein the second layer generation unit generates the antialiasing layer for only the largest base region in a case where the largest base region has a larger area than the largest character image region, and generates the antialiasing, layer for only the largest character image region in a case where the largest base region has a smaller area than the largest character image region.

13. A non-transitory computer-readable recording medium on which a computer program is recorded, the computer program executing the steps of:
a) generating a character image layer that represents a character image in a scanned image by a predetermined number of bits;
b) determining a base color of the character image;
c) generating an edge image of the character image;
d) generating an antialiasing layer that includes a binarized image generated based on the edge image and that is to be superimposed in a semi-transparent state on the character image layer; and
e) generating an electronic document that includes the character image layer and the antialiasing layer,
wherein the step d) includes the step of: d-1) setting the same color as the base color for the antialiasing layer.

14. An electronic document generation method for generating an electronic document based on a scanned image, implemented on a processor, and comprising the steps of:
a) generating a character image layer, using a processor, which represents a character image in the scanned image by a predetermined number of bits;
b) determining a base color of the character image;
c) generating an edge image of the character image;
d) generating an antialiasing layer that includes a binarized image generated based on the edge image and that is to be superimposed in a semi-transparent state on the character image layer; and
e) generating an electronic document that includes the character image layer and the antialiasing layer,
wherein the step d) includes the step of: d-1) setting the same color as the base color for the antialiasing layer.

\* \* \* \* \*